(12) United States Patent
Armstrong

(10) Patent No.: US 11,620,703 B1
(45) Date of Patent: Apr. 4, 2023

(54) REGISTRATION AND PROSPECTING MOBILE APPLICATION FOR REAL ESTATE SALES

(71) Applicant: REALTYTEK, LLC, Alexandria, VA (US)

(72) Inventor: DeLinda Kay Armstrong, Alexandria, VA (US)

(73) Assignee: Realtytek, LLC, Alexandria, VA (US)

(*) Notice: Subject to any disclaimer, the term of this patent is extended or adjusted under 35 U.S.C. 154(b) by 0 days.

(21) Appl. No.: 17/561,216

(22) Filed: Dec. 23, 2021

(51) Int. Cl.
*G06Q 40/03* (2023.01)
*G06Q 50/16* (2012.01)

(52) U.S. Cl.
CPC ............ *G06Q 40/03* (2023.01); *G06Q 50/16* (2013.01)

(58) Field of Classification Search
None
See application file for complete search history.

(56) References Cited

U.S. PATENT DOCUMENTS

| | | | |
|---|---|---|---|
| 8,433,650 B1* | 4/2013 | Thomas | G06Q 40/02 705/38 |
| 8,649,486 B1* | 2/2014 | Kellogg | G06Q 50/16 379/93.01 |
| 2013/0211963 A1* | 8/2013 | Williams | G06Q 30/04 705/26.43 |
| 2017/0200243 A1* | 7/2017 | Morgan | G06Q 50/01 |
| 2018/0137584 A1* | 5/2018 | Carmichael | G06Q 50/16 |
| 2021/0019846 A1* | 1/2021 | Kaddoura | G06F 9/54 |

OTHER PUBLICATIONS

Author unknown, Dominate Lead Management With the REW Leads App, retrieved from internet archives, archive captured Jan. 16, 2021, entire document pertinent, https://web.archive.org/web/20210116220145/https://www.realestatewebmasters.com/blog/dominate-lead-management-with-the-rew-leads-app/ (Year: 2021).*
Author unknown, How to Use the Zillow Premier Agent App, Jul. 8, 021, entire document pertinent, retrieved from https://gohow.co/how-to-use-the-zillow-premier-agent-app/ (Year: 2021).*

* cited by examiner

*Primary Examiner* — Gregory S Cunningham, II
(74) *Attorney, Agent, or Firm* — IP Authority, LLC; Ramraj Soundararajan

(57) ABSTRACT

Disclosed is a mobile CRM application, particularly for real estate agents, that allows the management of: (1) registration, (2) prospecting, (3) tours, and (4) transaction tracking for a large number of leads, customers and clients from a smartphone.

22 Claims, 34 Drawing Sheets

A Field Agent App for Real Estate Professionals

REGISTRATION AND PROSPECTING MOBILE APPLICATION FOR REAL ESTATE SALES

BACKGROUND OF THE INVENTION

Field of Invention

The present invention relates generally to the field of an application for real estate sales. More specifically, the present invention is related to a mobile application for registering and prospecting for real estate sales.

Discussion of Related Art

Most customer relationship management (CRM) solutions are desktop based and focus on lead generation and backend sales management. Other CRM solutions focus on marketing features, such as sending emails, flyers and text messages. Large company CRMs connect to mainstream search engines and use the prospect's home search to generate leads and streamline conversion of the leads to customers.

Some realtors who are in home sales do not need lead generation, but rather need a solution to help convert the many leads coming their way, capture their actionable information and finally manage this information in a way that would advance the sale.

However, what is lacking in the prior art is a mobile CRM application, particularly for real estate agents, that allows the management of: (1) registration, (2) prospecting, (3) tours, and (4) transaction tracking for a large number of leads, customers and clients from a smartphone. Such a CRM application could help a real estate agent manage work backlog.

Embodiments of the present invention are an improvement over prior art systems and methods.

SUMMARY OF THE INVENTION

The present invention will allow licensed real estate agents to manage their prospects looking to buy and/or sell homes. The licensed real estate agents will be able to add details of listings, clients, and customers. The application will automate the agent's prospecting process and allow the prospect a more efficient process into buying/selling homes.

In one embodiment, the present invention provides an electronic device, comprising: (a) a display; (b) a touch-sensitive surface; (c) one or more processors; (d) memory; and (e) one or more programs implementing a customer relationship management (CRM) for a real estate agent, wherein the one or more programs are stored in the memory and configured to be executed by the one or more processors, the one or more programs including instructions for: (1) when the real estate agent is not previously registered, displaying, in the display, a first user interface for registering a real estate agent; (2) when the real estate agent is previously registered, displaying, in the display, a second user interface for logging in the real estate agent; (3) displaying, in the display, a third user interface for depicting a home/dashboard for quick redirection on the following sections/screens: recently added buyers displayed with call, text and email buttons and recently added properties along with call, text and email buttons; and (4) displaying, in the display, a fourth user interface for depicting any of, or a combination of, the following information associated with one or more leads/prospects, customers and clients: leads information for onboarding prospects by getting simple information, buyer information on clients interested in purchasing properties, and contract information on properties of clients that are selling properties.

In another embodiment, the present invention provides a non-transitory, computer accessible, memory medium storing program instructions for implementing a customer relationship management (CRM) for a real estate agent, wherein the one or more programs are stored in the memory and configured to be executed by the one or more processors, the medium comprising: (a) when the real estate agent is not previously registered, computer readable program code displaying, in the display, a first user interface for registering a real estate agent; (b) when the real estate agent is previously registered, computer readable program code displaying, in the display, a second user interface for logging in the real estate agent; (c) computer readable program code displaying, in the display, a third user interface for depicting a home/dashboard for quick redirection on the following sections/screens: recently added buyers displayed with call, text and email buttons and recently added properties along with call, text and email buttons; and (d) computer readable program code displaying, in the display, a fourth user interface for depicting any of, or a combination of, the following information associated with one or more leads/prospects, customers, and clients: leads information for onboarding prospects by getting simple information, buyer information on clients interested in purchasing properties, and contract information on properties of clients that are selling properties.

BRIEF DESCRIPTION OF THE DRAWINGS

The present disclosure, in accordance with one or more various examples, is described in detail with reference to the following figures. The drawings are provided for purposes of illustration only and merely depict examples of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

FIG. 2 depicts the various screens for login and registration.

FIG. 4 depicts various screenshots of the application's customer/prospect interface.

FIG. 6 depicts sample screenshots of the application's agent-side customer add/edit and registration interface.

FIG. 7 depicts various screenshots of the application's agent-side Client Profile page.

FIG. 10 depicts various screenshots of the contract details and tracking interface.

FIGS. 11-12 depict various screenshots of the agent-side listings and seller client interface.

FIG. 14 depicts various screenshots of the Appointments interface.

FIG. 16 depicts various screenshots of the Real Estate Agent's E-Business Card interface.

FIG. 20 depicts various screenshots of the About, FAQs, Privacy Policy, and Terms & Conditions interfaces.

FIG. 23 depicts various screenshots of the customer-side buying details interface.

FIG. 27 depicts various screenshots of the customer-side selling interface.

FIG. 28 depicts various screenshots of the Contract Details interface.

FIG. 32 depicts various screenshots of the My Account, Edit Profile and Change Password customer-side interfaces.

DESCRIPTION OF THE PREFERRED EMBODIMENTS

Figure 1:
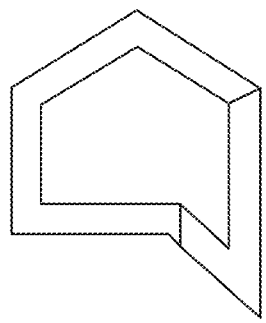
FIG. 1 depicts a non-limiting example of such a splash screen.

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein.

The present invention is a mobile CRM application technology specifically for real estate professionals. It enables registering, prospecting and tracking multiple leads, customers and clients throughout the real estate search and transaction process. It encompasses real estate agent features specific to the daily tasks of real estate sales agents.

Unlike the prior art, the present invention provides a front-end CRM interface for the real estate agent, where the real estate agent CRM provides functions that digitize the essential high priority tasks required of agents. The present invention's CRM interface combines prospecting, home search, tour tracking, feedback and transaction tracking into a simple accessible interface for real estate agents, where real estate agents may share such information with their leads/customers and clients (as a sales tool).

The following table depicts the various roles (licensed real estate agent, general user (prospect or customer or client), or Administrator), the interfaces they use (e.g., mobile app or web panel), and the tasks and actions that are possible for each role via the present invention's CRM interface.

| Role | Group/User | Available Tasks/Actions |
| --- | --- | --- |
| Licensed Real Estate Agents | Mobile App | Splash, Sign-Up/Registration, Login, Forgot Password, Bottom Navigation (Home/Dashboard (Search, Notifications, Buyers, CTA, Listings, Under Contract), Customers (Leads (Add/Update/Delete), Buyers (Add/Update/Delete), Under Contract), Listings, Calendar, Appointment (Pending, Confirmed, Rejected)), Side Menu (My Profile, Home, E-Business Card, Subscriptions, Lenders & State Agency Disclosure, Settings, Change Password, Static Content (Terms and Conditions, Privacy Policy, FAQs), Logout). |
| General User (Prospect) | Mobile App | Registration (Add requirements for new home), Login, Forgot Password, Bottom Navigation (Home/Dashboard (Agent Info and CTA, Recommended Homes, My Listings, Buying Queries), Selling (Add Queries, View Queries, Add Queries/Properties), Broker's E-Business Card, Appointments (Pending, Confirmed, Rejected)), Side Menu (Home, My Accounts (Edit Profile, Change Password), My Calendar, Approved Lenders), Notification, Logout). |
| Administrator | Web Panel | Login, Broker's Management (Add Licensed real estate agents, Edit Licensed real estate agents, Delete Licensed real estate agents, View Licensed real estate agents, View Broker's Client, Activate/Deactivate Broker), Prospect Management (View Prospect, View Prospect's Licensed real estate agents, Add Prospect, Edit Prospect, Delete Prospect, Activate/Deactivate Prospect), Static Content Management (View, Edit, Delete), Logout. |

Real Estate Agents Application Design

The present invention's user interface design is clean, attractive, clutter-free, and according to modern norms and standards, where the user interface design of the application will reflect the industry of the application.

Splash Screen

The application will start with an appealing and interactive splash screen, which will display the app's name, logo, tag line. FIG. 1 depicts a non-limiting example of such a splash screen. This screen may appear for 3-5 seconds on the mobile application. The splash screen's purpose is that it covers the time while the app is loading.

Real Estate Agents Registration Module

Figure 2:
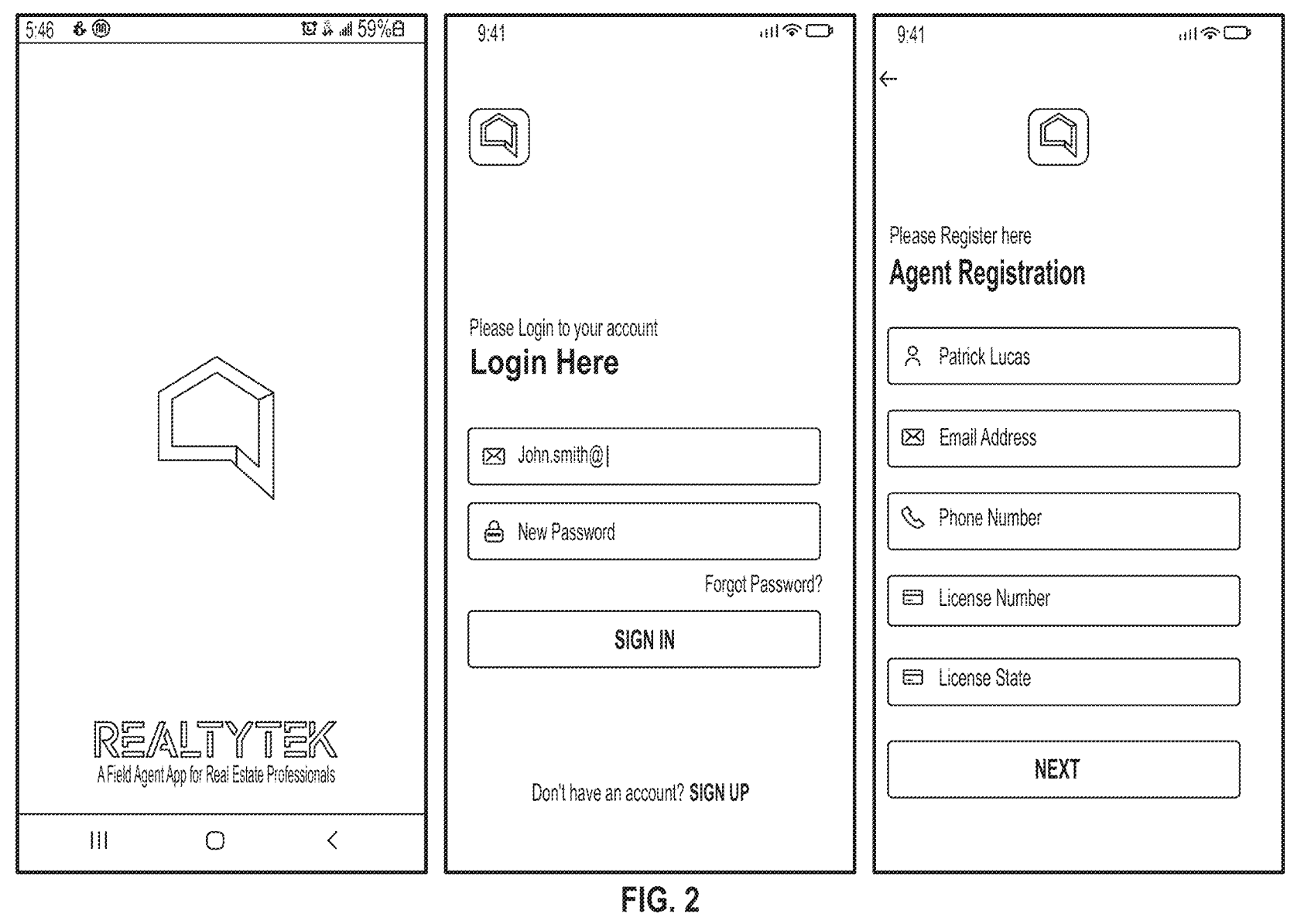

After the splash screen, Real Estate Agents will be navigated to the registration screen where they will be able to enter the required details. FIG. 2 depicts the various screens for login and registration.

Sign-Up

After the splash screen, users will be re-directed to the Sign-Up or Sign-In screen from where they may opt to Sign-Up. Doing so will re-direct them to the Sign-Up screen of the application.

Some of the information requested are summarized in the table below:

| Fields | Validations | Example |
|---|---|---|
| Photo Upload | This field will accept various image media formats | |
| Company Logo | .png, .jpg, .jpeg | |
| Full Name | This field will only accept Alphabets as input. The field will be validated to accept a string with only one space in between. | "John Doe" |
| Email Address | This field will accept Alphabets, Numbers, and Symbols. The stand email validations will also apply, i.e., email addresses consist of a local part, the "@" symbol, and the domain respectively. | johndoe94@gmail.com |
| Business Office Address | This field will accept Alphabets, Numbers, and Symbols. | |
| City, State, Zip | This field will accept Alphabets and Numbers. The standard validations will apply. | "Arlington, VA 12345" |
| Phone Number | This field will accept Numbers Only | "+17644448881" |
| Password | This field will accept Alphabets, Numbers, and Symbols. | "Johnabc123@" |
| Confirm Password | This field will accept Alphabets, Numbers, and Symbols. | "Johnabc123@" |
| License No. | Only numbers are acceptable | 1536565654563 |
| License State | Alphabets | California, United States |

Upon submission of Sign-Up form, the user will receive a confirmation email for verification.

Sign-In

Users who have registered using the Sign-Up form will Sign-In to their account by providing their email address and Password. In contrast, users who have used their social media account to register will select the appropriate social media to do so. Sign-In is necessary to use the application.

| Fields | Validations | Example |
|---|---|---|
| Email Address | This field will accept Alphabets, Numbers, and Symbols. The standard email validations will also apply, i.e., email addresses consist of a local part, the "@" symbol, and the domain respectively. | "johndoe94@gmail.com" |
| Password | This field will accept Alphabets, Numbers, and Symbols. | "Johnabc123@" |

Forgot Password

The application will include the 'forgot password' functionality, which can be used if any user forgets their password. If the user forgets their password, there will be a "Forgot Password?" CTA present on the Login Screen which, when clicked, the user will be asked for the email address that they used to register to the application. The user will enter their email address, submit it, then the email address will be authenticated and an email will be sent to that email address in which there will be a randomly generated password to access their account and a message to change their password as soon as possible.

Figure 3:
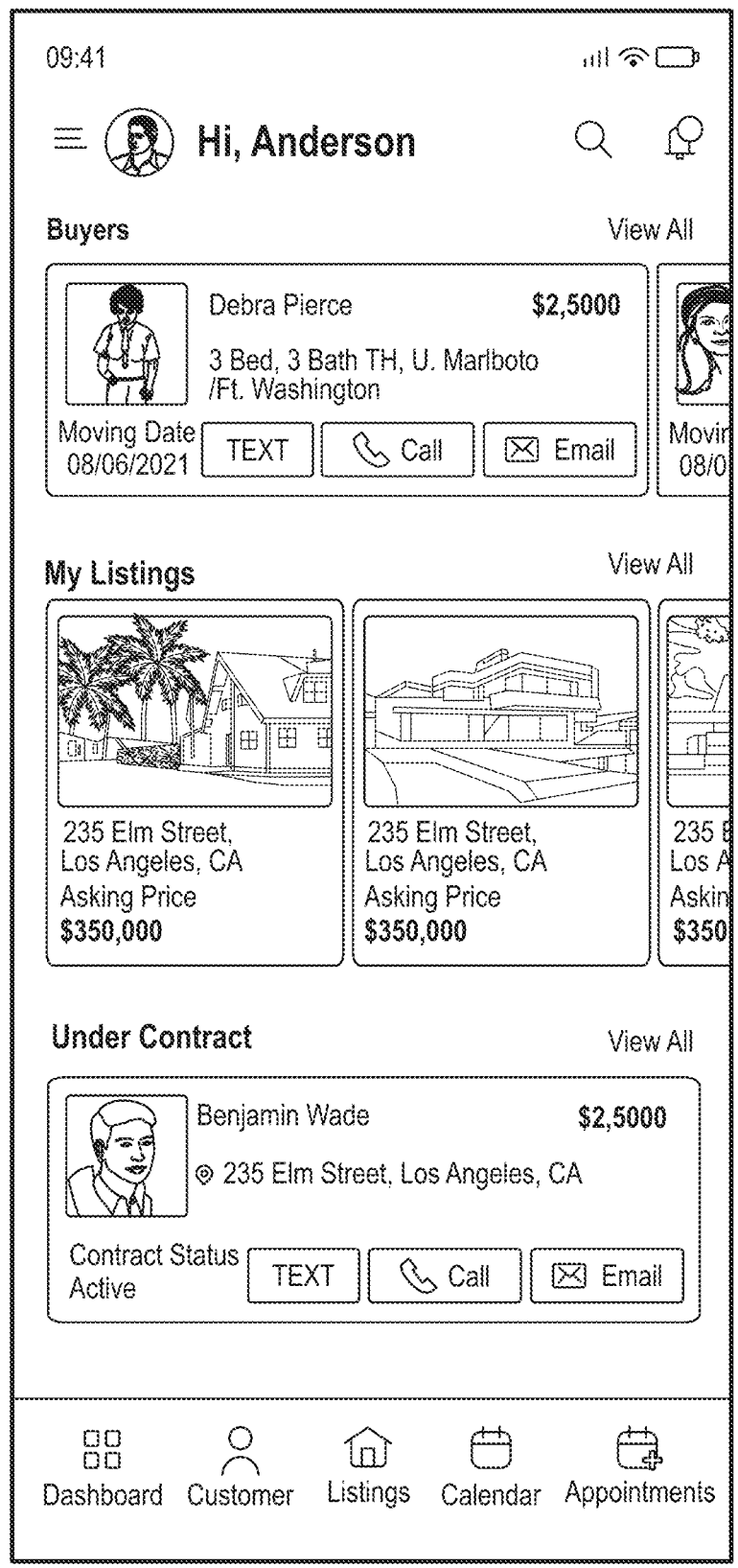
FIG. 3 depicts a screenshot of the application's agent-side dashboard.

FIG. 3 depicts a sample screenshot of the application's home page.

Home/Dashboard

The home page of the application works as a dashboard, for quick redirection on the following sections/screens:

Buyers: Recently added buyers will be shown on the carousels, there will be CTA (Call, Email, Text) buttons with each buyer.

My Listings: Recently added propert(ies) manually input, API integrated or downloaded "Recommended Properties" and seller listings of the Agent will be shown on the "My Listing" section, along with CTA buttons.

Customers/Prospect

Figure 4:
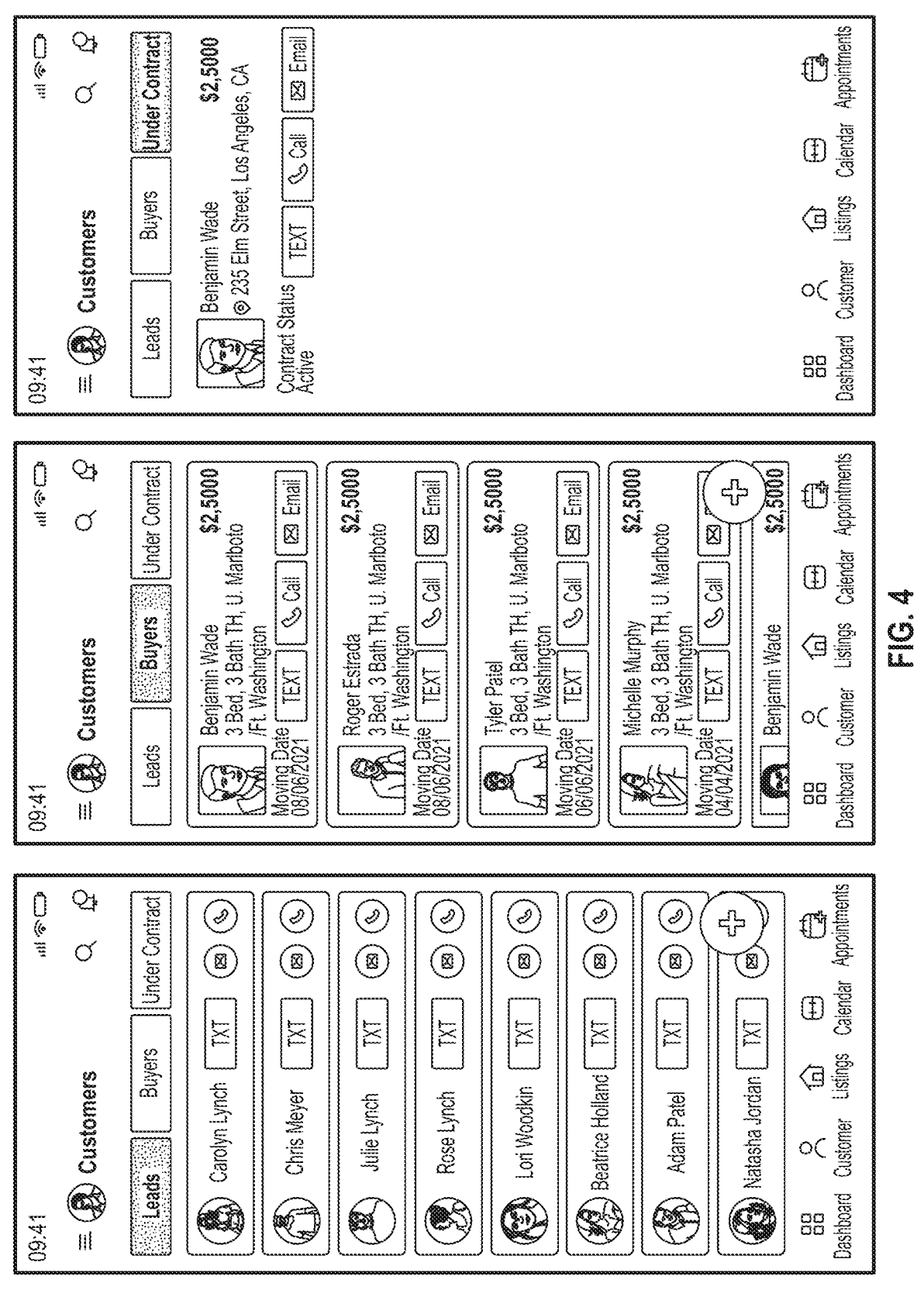

FIG. 4 depicts various screenshots of the application's customer/prospect interface. Prospects are also known as Customers; this option is further divided into three sections. "Leads", onboarding prospects who have been manually added into the app or invited via text, email or social media to download the app, but have not yet done so or have not registered in the app by getting simple information; "Buyers", who would like to purchase a house; and the last section is "Under Contract", consists of those who become clients from a Buyer status or from a Seller in the "My Listings" section once their properties are Under Contract.

Leads

Figure 5:
FIG. 5 depicts various screenshots of the application's add Leads function interface.

FIG. 5 depicts various screenshots of the application's leads interface. Every prospect, either buyer or seller, will be registered (entered from the Agent's phone contacts list or entered manually to be shared via text, email or social media) by the Agent. There will be a "+" button on the bottom right corner, from where the agent registers their customers and sends an invite to login the details. To register the customer, the Agent needs to fill in the following information: Full Name, Phone Number, and Email Address.

There will be a "Send Invite" button, from where the automated password will be sent to the customer's email or as a text message using the information provided above in order that the Lead/Customer may download the app on their smartphone or device. The above details can also be edited by the Real Estate Agent and have the option to Delete the customer by pressing the "Delete Lead" Button.

Buyers

Figure 6:
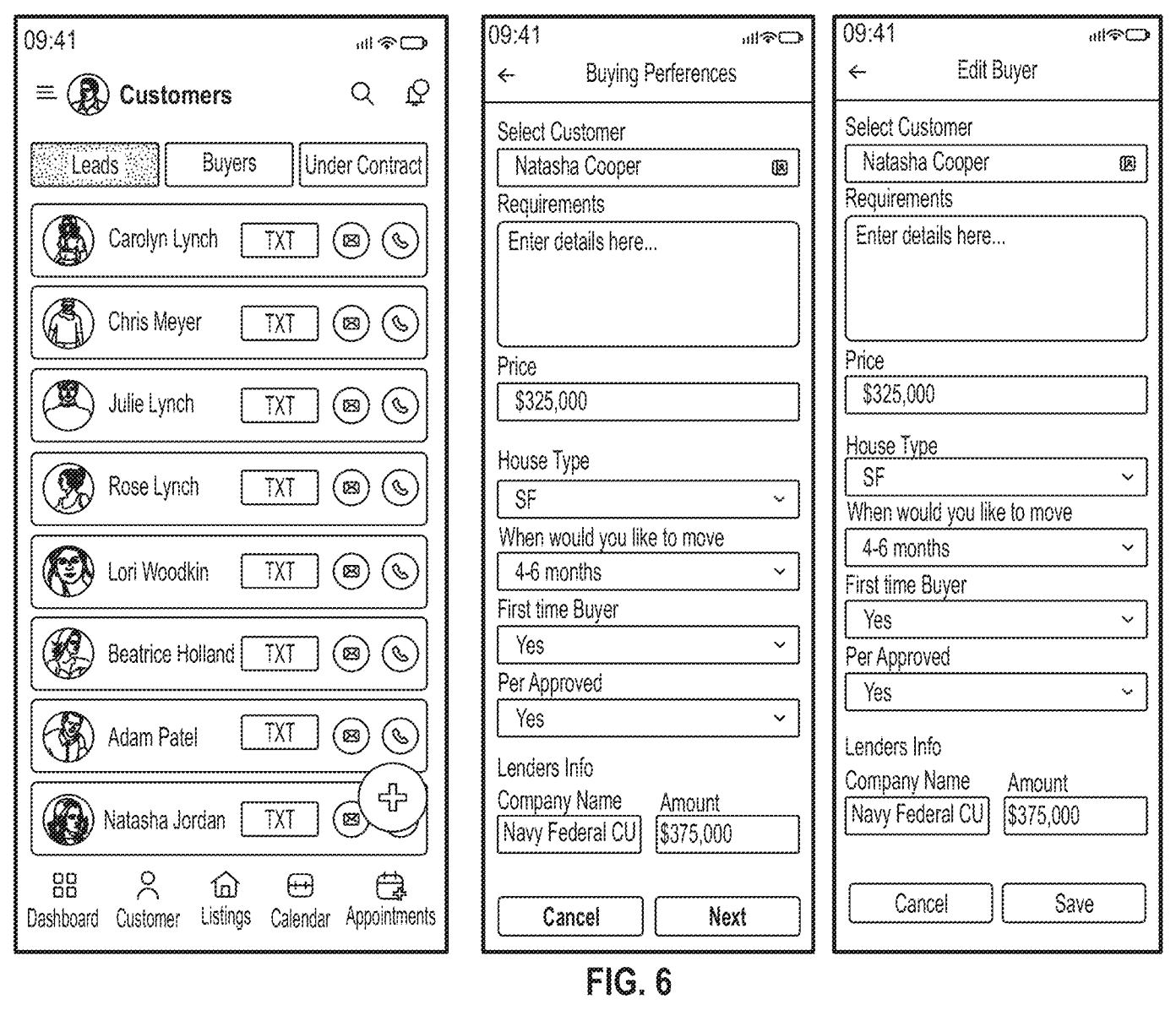
Figure 7:
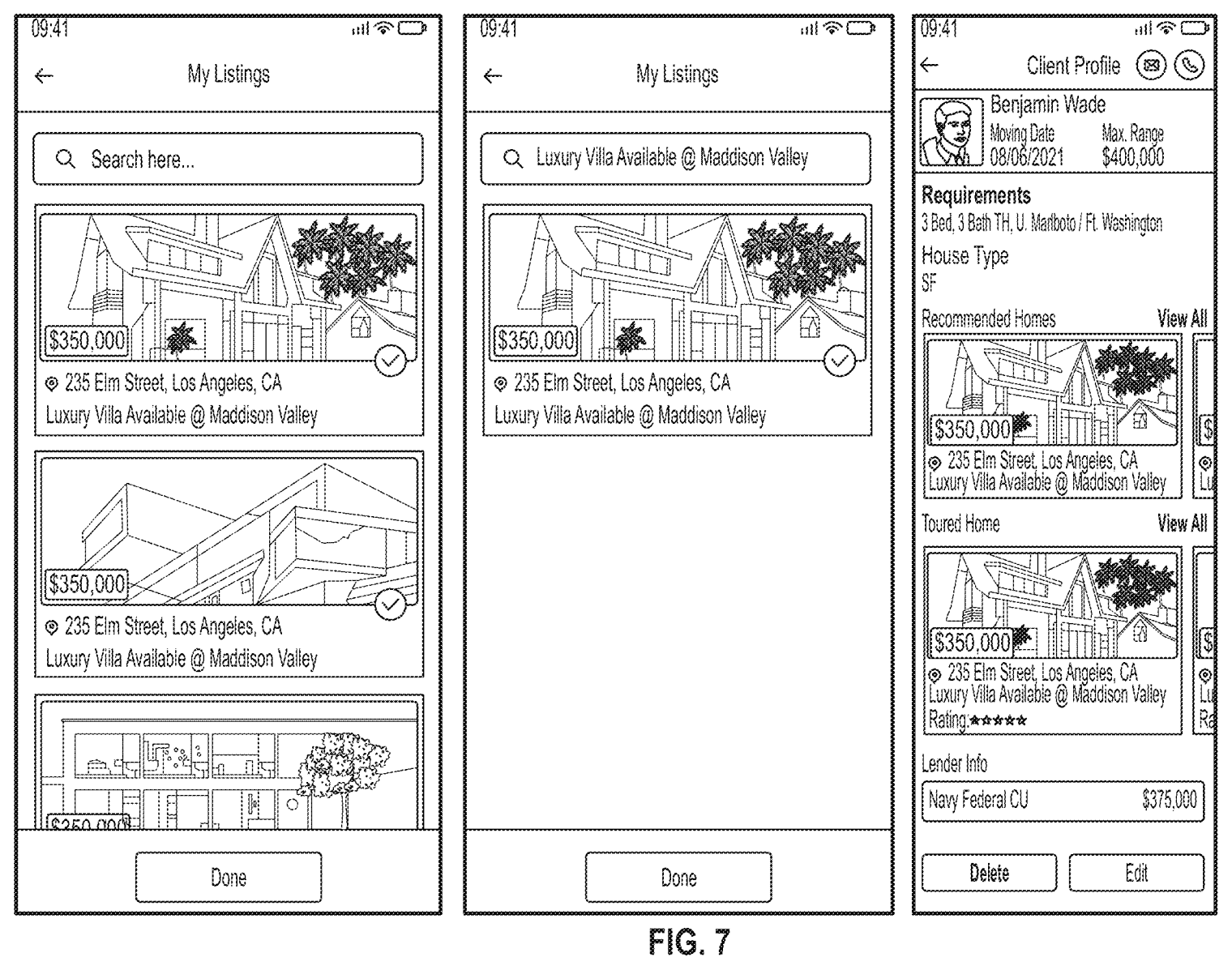
Figure 8:
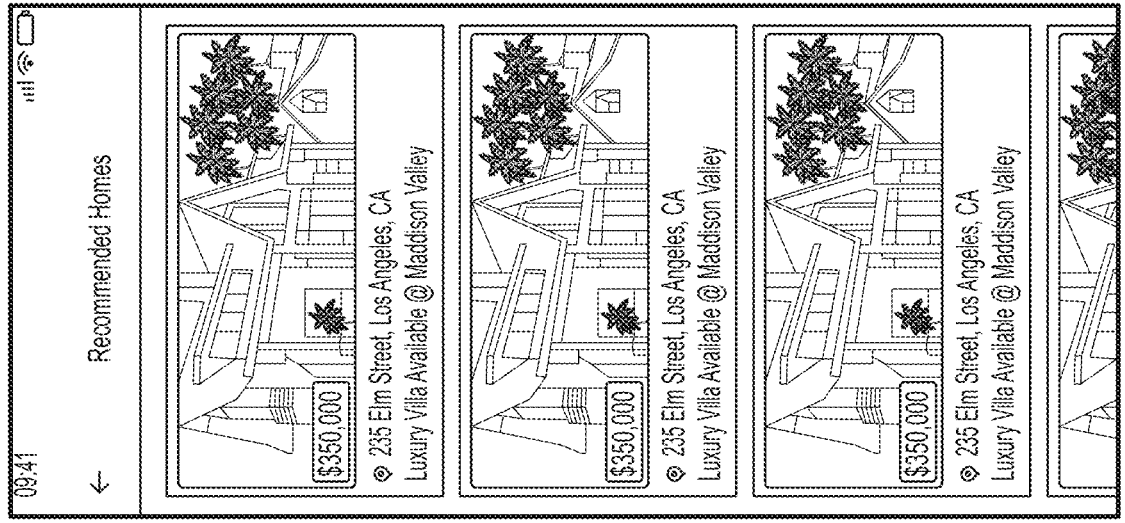
FIG. 8 depicts various screenshots of the application's agent-side details of customers feedback/notes and rating of a toured home in that customers profile.
Figure 8:
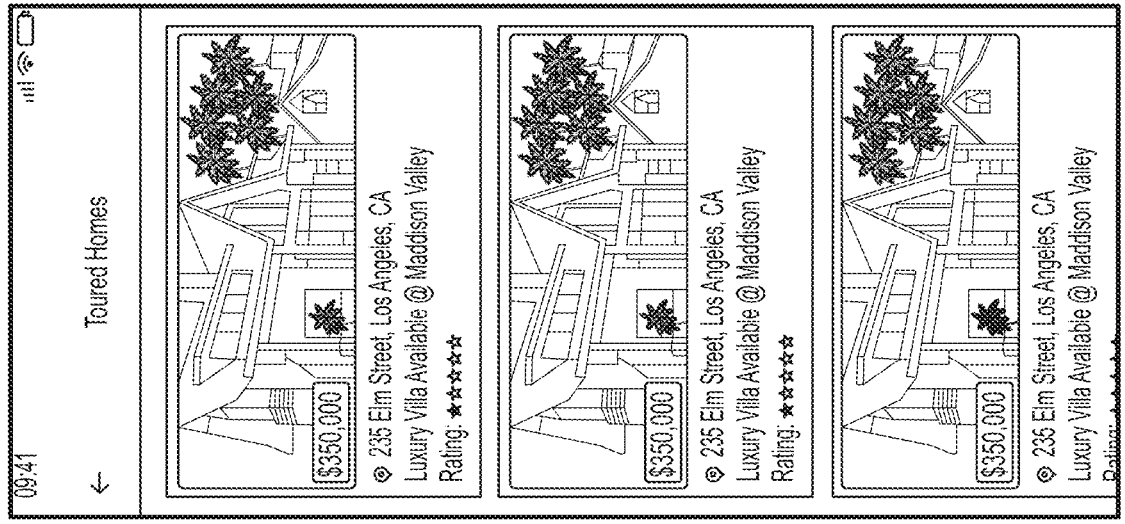
Figure 8:
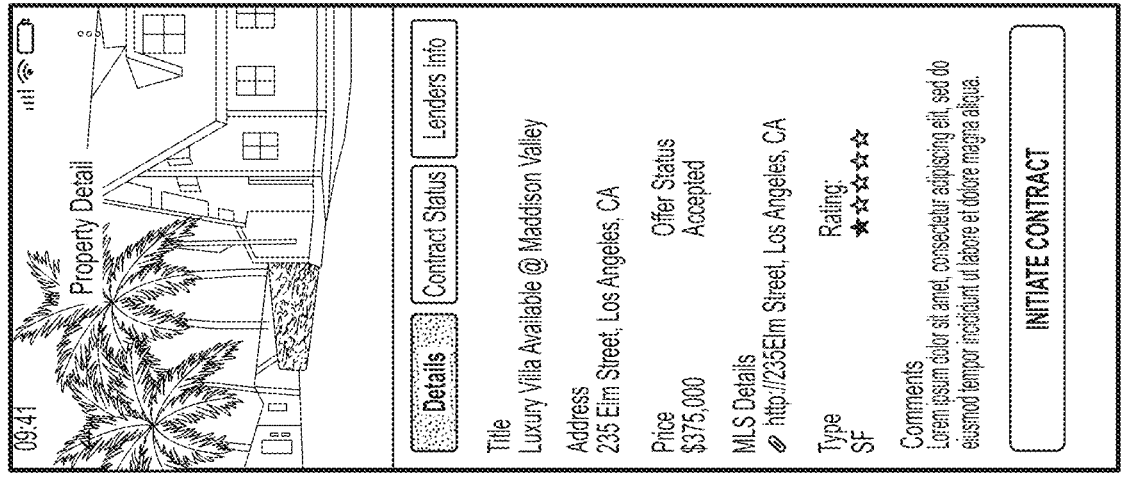

FIGS. 6-8 depict sample screenshots of the application's buyer interface. On the buying section, the user can view multiple buying queries in the form of cards. The card shows the prospect's picture, their requirements, price range, CTA (Text, Email & Phone), and the moving date. The leads who would like to purchase any property can fill the buying form when they download the app onto their device, from their provided account as well as the Real Estate Agents can fill the buying preference form, and also suggest the available properties they have.

Add Buying Query

On the buyer's section we have added a button on the bottom right corner from where the Agent can fill in the following information:

- Select Customer: The user needs to select the customer first, whom they've added from the lead section.
- Requirements: The descriptive requirement, against the user preferences like, how many beds and bathrooms are required, etc.
- Price Range: Maximum prices, to analyze the prospect's pocket size.
- House Type: Dropdown (SF, C, TH, F, L, Rental)
- When would you like to move: Dropdown (As soon as possible, 90 Days, 4-6 Months, 6-12 Months)
- First Time Home Buyer: Dropdown (Yes/No)
- Pre-Approved: Dropdown (Yes/No)

After filling out the above information, Real Estate Agents will press the next button to recommend homes to the buyer against his requirements. The Real Estate Agents need to select the homes and press done. The card will be created on both (Real Estate Agent & Prospect) sides against the buying form. These homes will be shown on the detail screen of the buyer in the recommended homes section.

Recommended Homes

In addition to the "Recommended Homes" being added from the mobile phone, they can be added from the desktop interface, or by way of API integration. Application Programming Interface (API) between multiple listing services and/or search engine websites will be used to seamlessly integrate "Recommended Homes" into the mobile application.

Also, the prospect will be notified if their application is installed and logged in. The buying query details can be edited or deleted from the Real Estate Agent's side. If the prospect likes any of the recommended homes, then they will ask for an appointment from their Agent. Once the prospect toured the recommended homes, that means the appointment has been accepted by the Real Estate Agent and the date of appointment has passed then the property will move from recommended homes to toured homes, and the prospect will be able to post the feedback and rate the property which will be shown on the detailed screen of buying query. If the prospect finalizes any property and they would like to proceed with the documentation phase, then the Buyer or Real Estate Agent will press the "Initiate Contract" button. After that, the property will be shown in the Under Contract section.

Recommended Section & Toured Section have the "View all" button from where the user can see all the properties recommended by the Agent and toured by the prospect, respectively. Every property has three sections: Details, Contract Info, and Loan Info. Contract and Loan Info sections are initially disabled, unless and until the property goes under contract.

Under Contract

Figure 9:
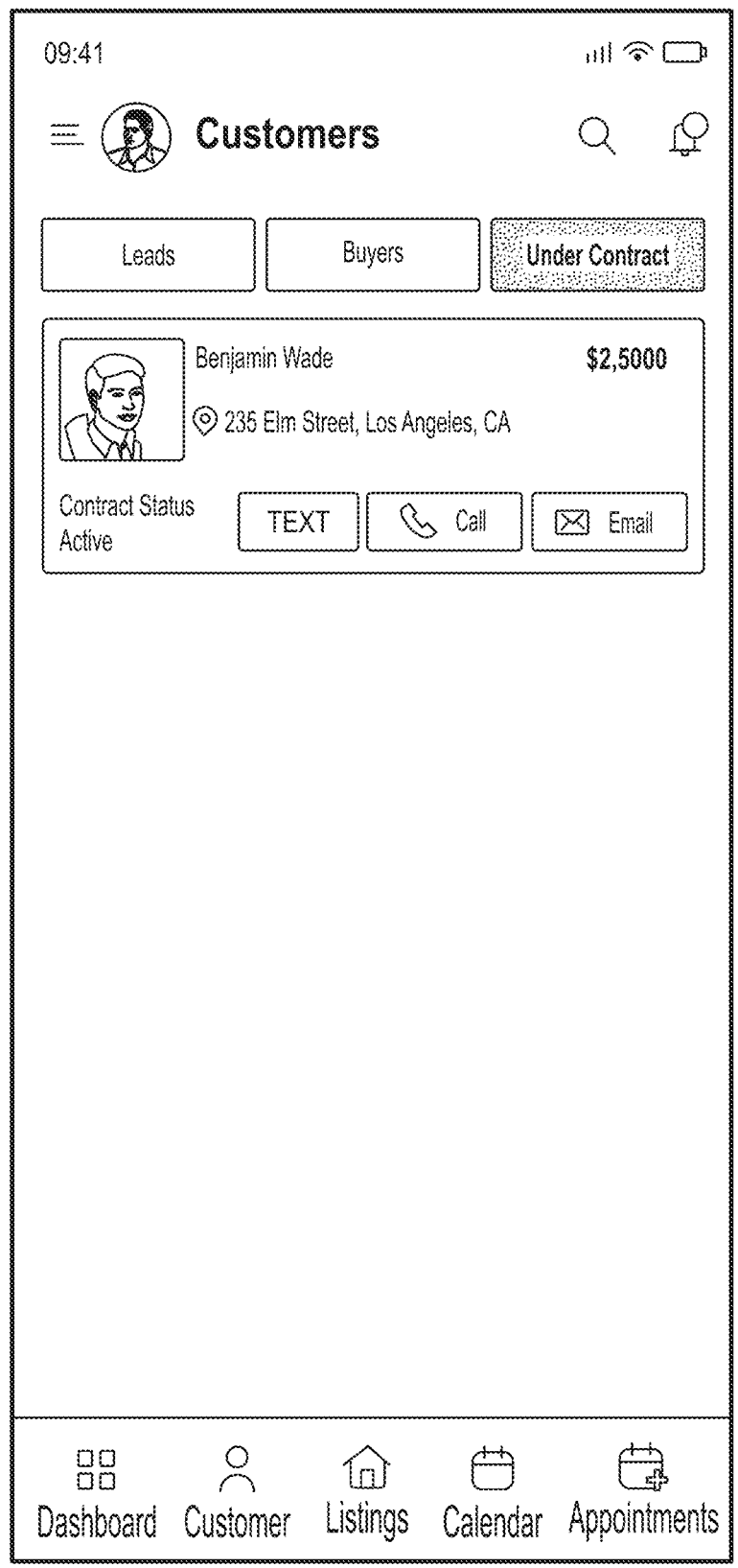
FIG. 9 depicts a screenshot of the list of customers under contract interface.

FIG. 9 depicts various screenshots of the under contract interface. Against each toured property there will be an "Initiate Contract" button, once the Agent taps the initiate contract button the property will move to the Under Contract section. Properties going under contract will be mentioned on the Customer's Under Contract section for instant usage. When the user taps on the property card, the detailed screen will be the same as the buyer after initiating the contract. The detail screen has the prospect's information and CTA for call, text and email, which will redirect to the native call, text and email option.

Details

Figure 10:
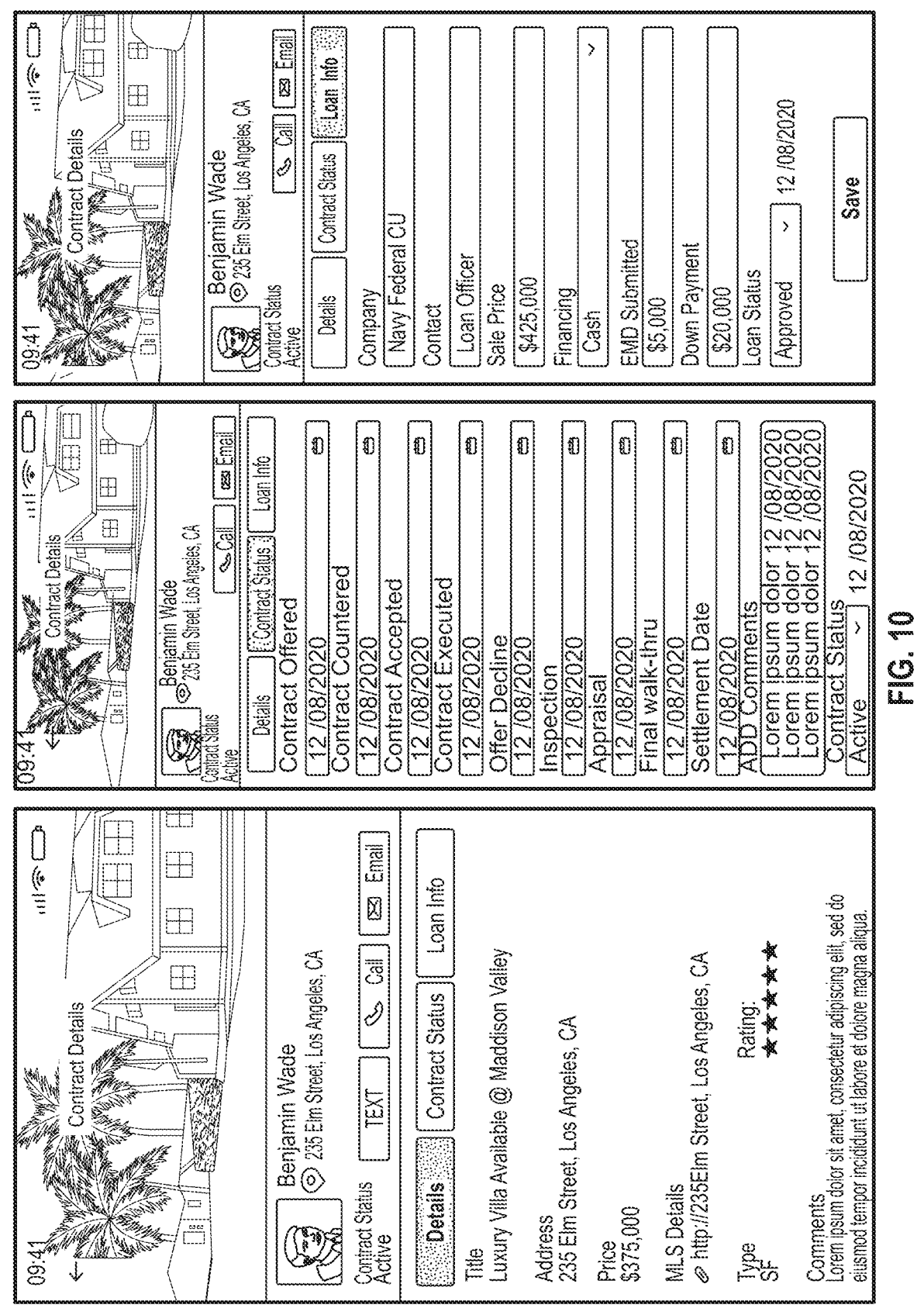

FIG. 10 depicts various screenshots of the contract details interface. The detailed section has the following info: Property Title, Address, Price, MLS Details or link, Type, Rating and Comments.

Contract Status

The contract statuses section has the following statuses: Contract Offered, Contract Countered, Contract Accepted, Contract Executed, Contract Declined, Offer Rescinded, Inspection, Appraisal, Final Walk-Thru, Settlement Date, and Add Comments; these are all date fields except comments and contract status dropdown. Real Estate Agents can update the dates against each status and save them for record-keeping; these dates and comment updates by Real Estate Agents can be viewed by the Real Estate Agent's Client.

Status: Dropdown (Active, Cancelled, Settled, Withdrawn). Whenever the status will be updated, the current date will be automatically saved.

Loan Status

The loan details have the following information, which is also viewable by the Real Estate Agent's client.

- Company
- Contract Sale Price
- Financing dropdown (Cash, Conventional, FHA, VA, USDA)
- EMD Submitted
- Down Payment
- Loan Status: dropdown (Applied, Approved, Denied, Underwriting, Appraisal, Final Underwriting, Cleared to Close, Closed/Settled) with Auto Dates.

Listings

Figure 11:
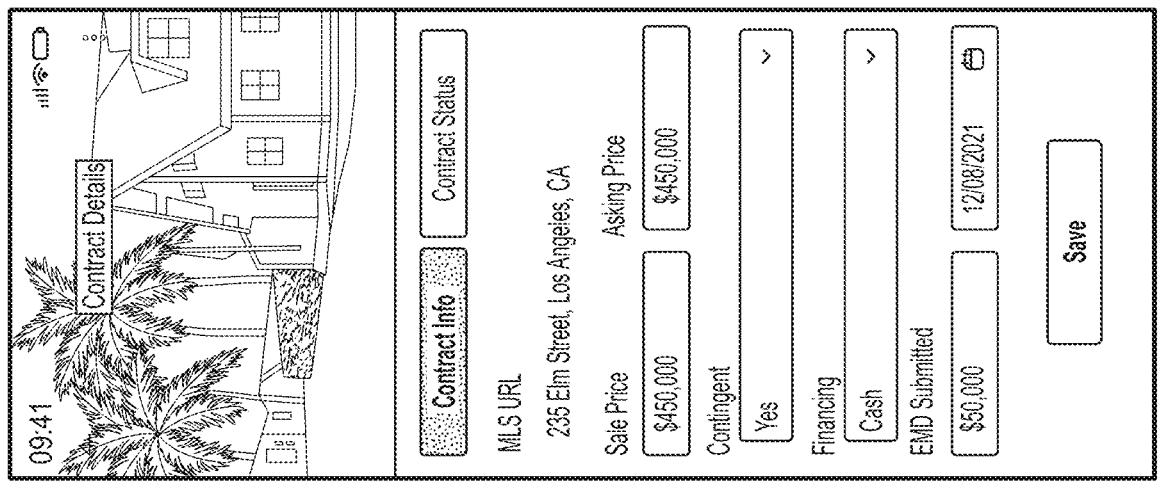
Figure 11:
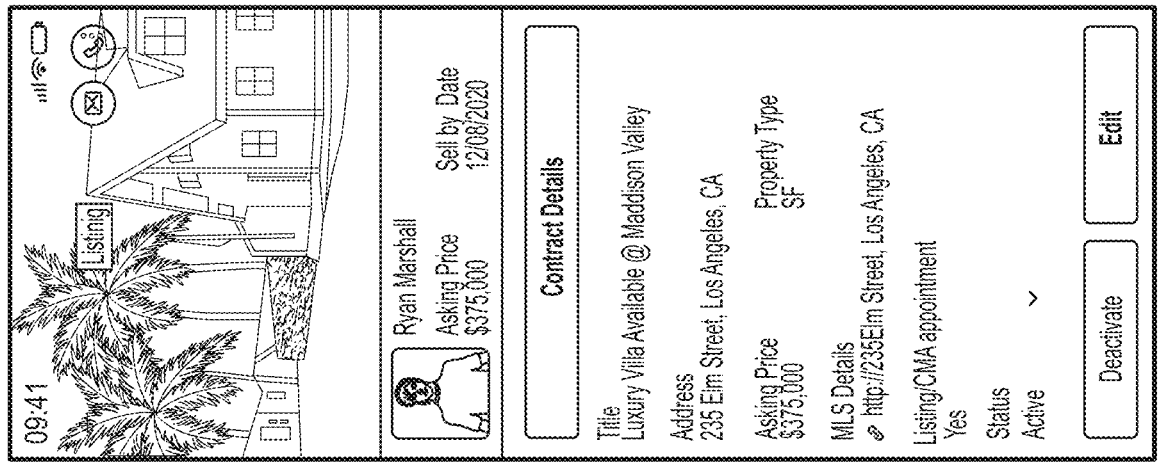
Figure 11:
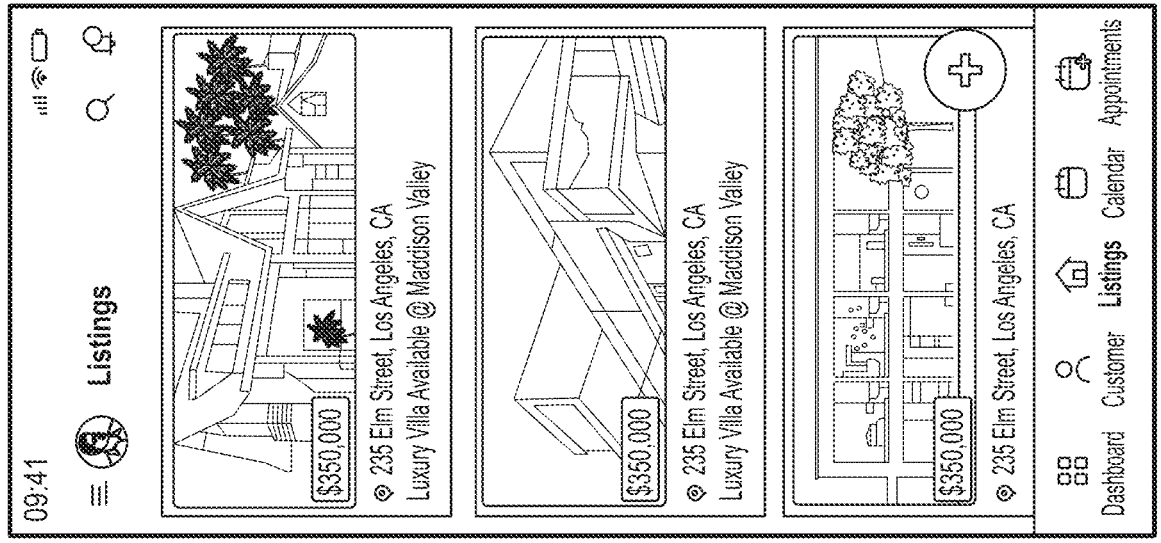
Figure 12:
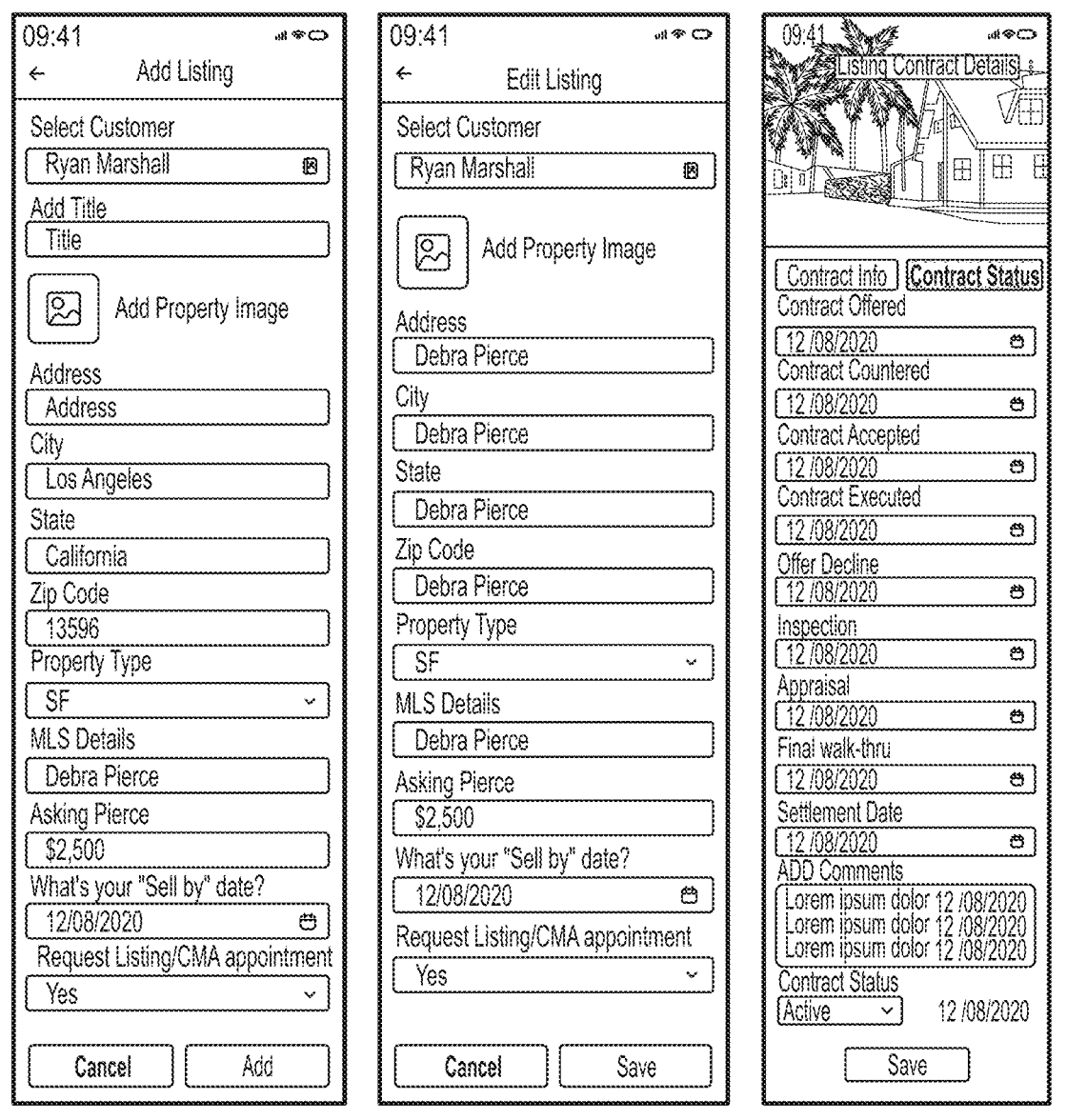

FIGS. 11-12 depict various screenshots of the listings interface. All the properties are added from the listing section on the bottom navigation. The listings can be added by the client-side. Those properties clients are willing to sell will be shown on the Agent's Listing section.

Add Listings

To add the listing, users need to fill in the following details:

- Select Customer: The user needs to select the customer first, whom they've added from the lead section
- Street Address
- City
- Zip code
- MLS Details
- Asking Price
- What is your "Sell by" Date
- Request Listings/CMA Appointment It should be noted that properties can be added by the Real Estate Agent side without adding customers, also the properties can be added by the Sub Admin.

Calendar

Figure 13:
FIG. 13 depicts a screenshot of the Calendar interface.

FIG. 13 depicts a screenshot of the calendar interface. The Calendar section has the summary of the booked appointment. The dot on the dates notifies the user the date has an appointment and at the bottom, appointment details are mentioned which contains the prospect name, address, and time.

Appointment

Figure 14:
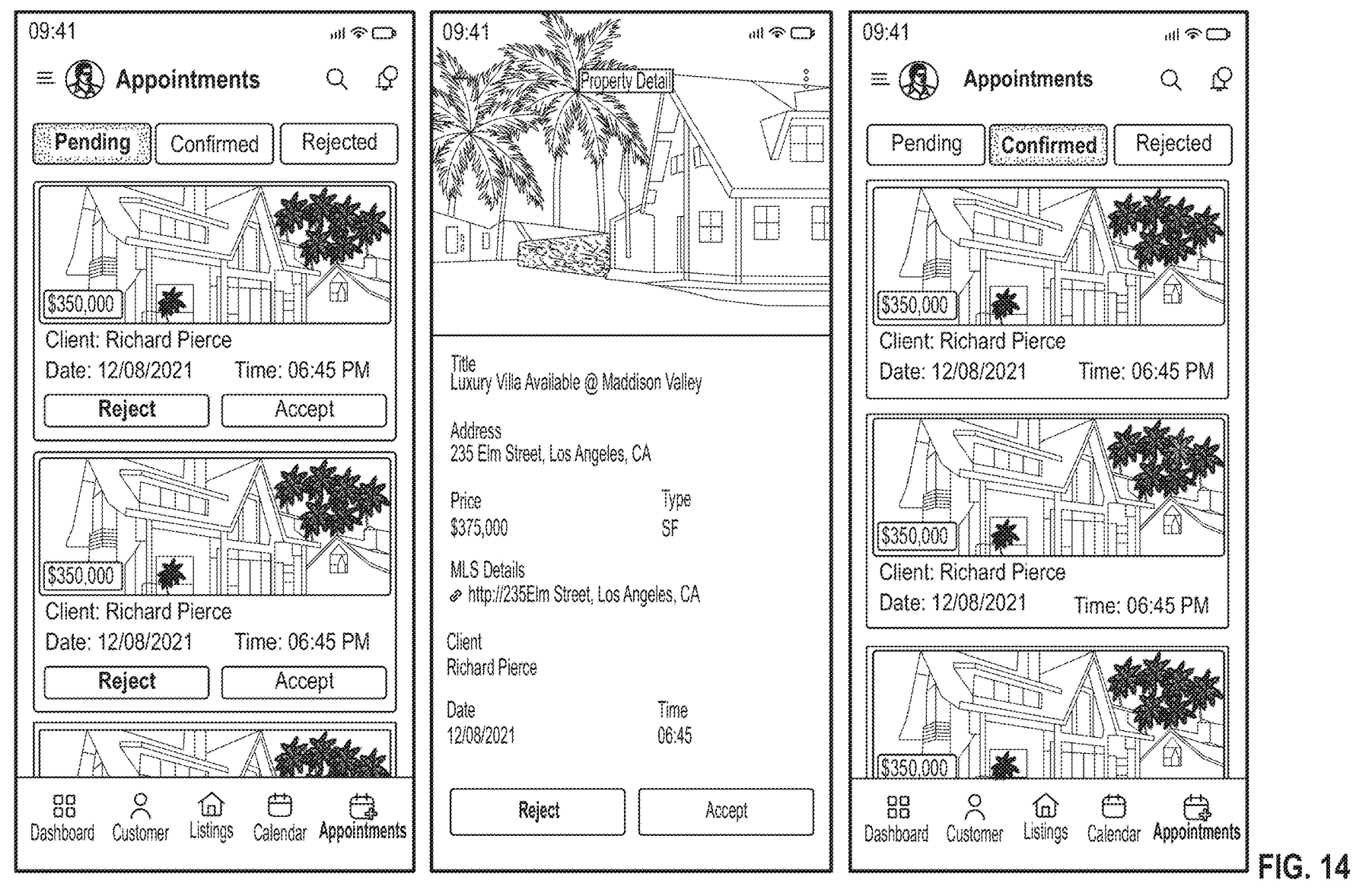

FIG. 14 depicts various screenshots of the appointments interface. The prospects who are interested in any property will ask for an appointment with a Real Estate Agent. The appointments have three sections, mentioned below:

Pending: The appointments are not accepted yet, will be pending.

Confirmed: The accepted appointments are listed in the confirm section.

Rejected: The appointments rejected from the Real Estate Agent's side will be listed in the rejection section.

Side Menu

Figure 15:
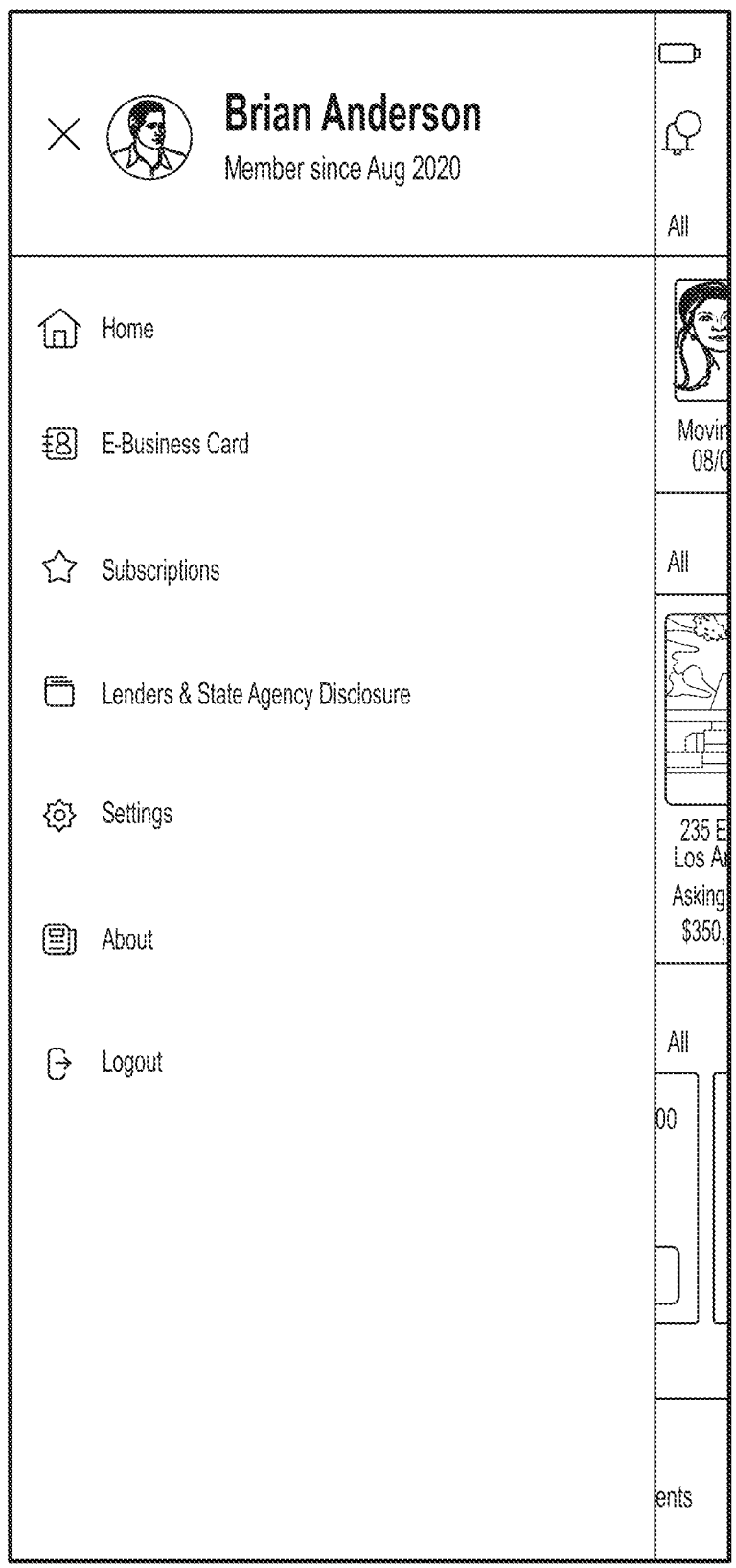
FIG. 15 depicts a screenshot depicting the side menu.

FIG. 15 depicts a screenshot depicting the side menu associated with the present invention's application. The side menu has the following options: My Profile, Home, E-Business Card, Subscription, Lenders and State Agency Disclosure, Settings, About and Logout.

E-Business Card

Figure 16:
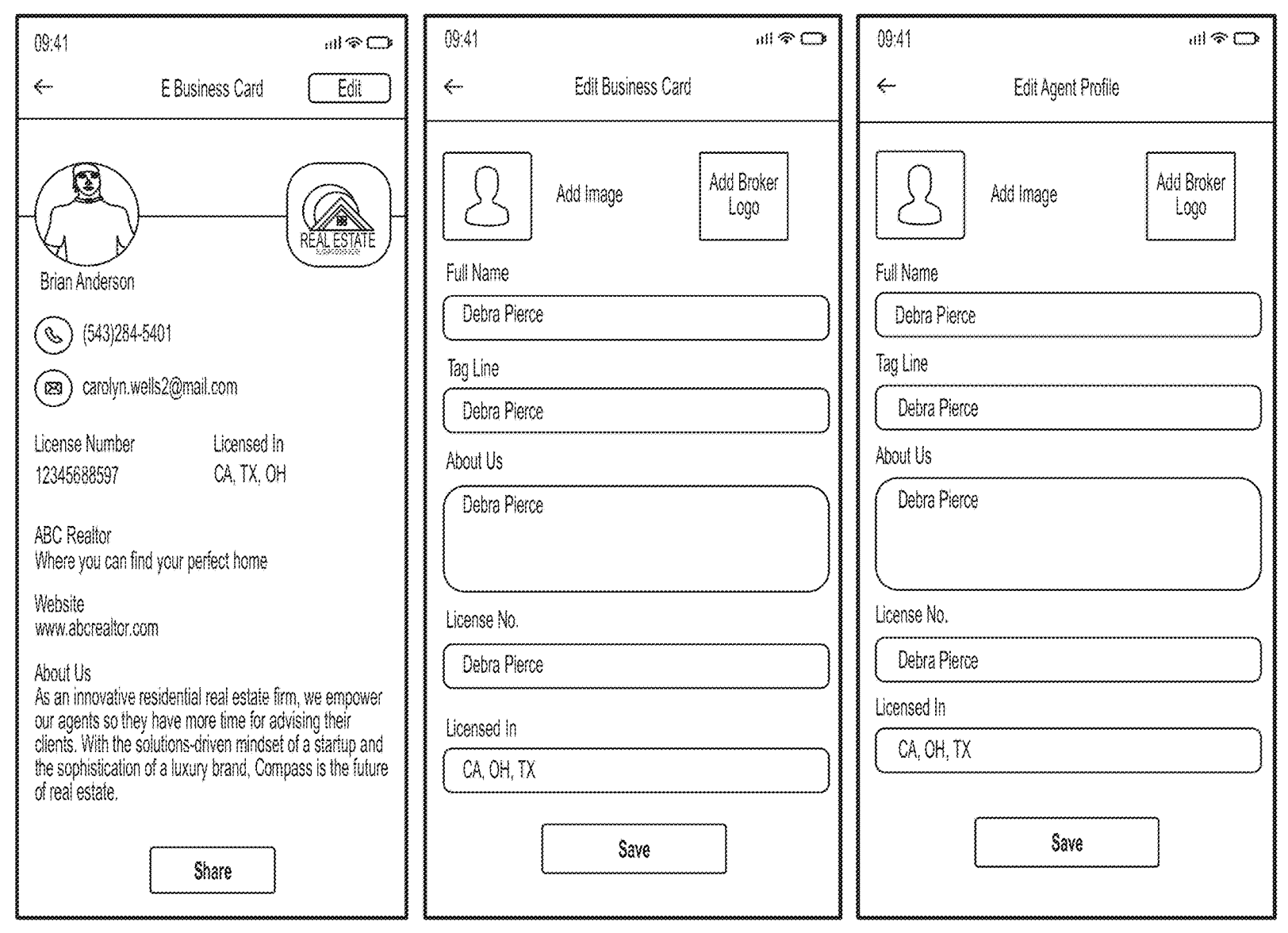

FIG. 16 depicts various screenshots of the E-Business Card interface. During the sign-up we asked for the basic information, users will be able to view all fields that are filled during the sign-up and can edit their profile; they can also update their profile picture. The email address which is the primary key will remain un-editable.

Upload Profile Picture

Full Name

License No.

Phone No.

Email

Address

Web site

Upload Broker's Logo

Licensed Issued In

About Us

Tagline

There will be a share button that shares the licensed real estate agents' business card to the default sharing medium.

Subscription

Figure 17:
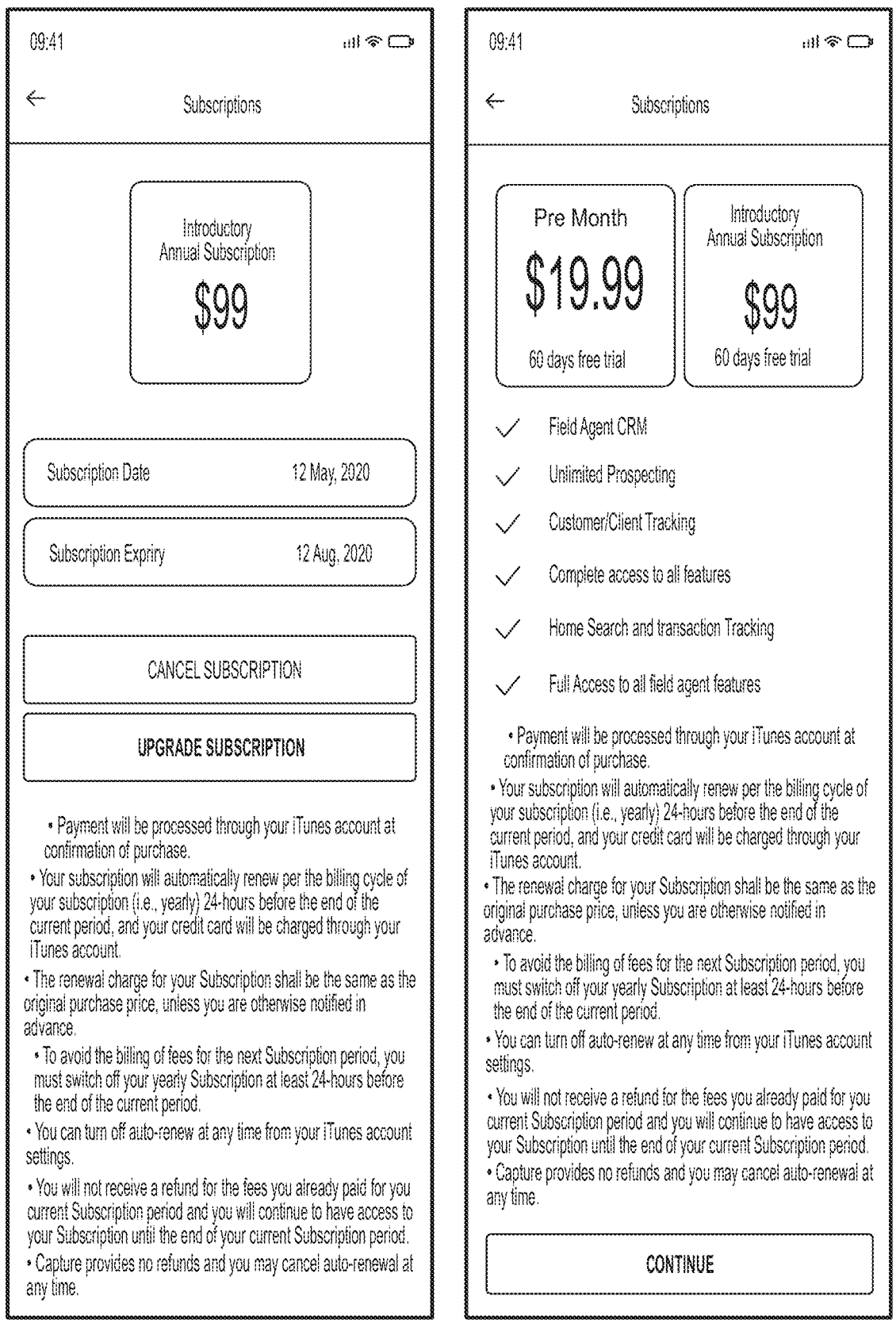
FIG. 17 depicts a screenshot of the Subscriptions interface.

FIG. 17 depicts a screenshot of the subscriptions interface. To use this application, Real Estate Agents need to subscribe to either a Monthly or Annual package.

Lenders & State Agency Disclosure

Figure 18:
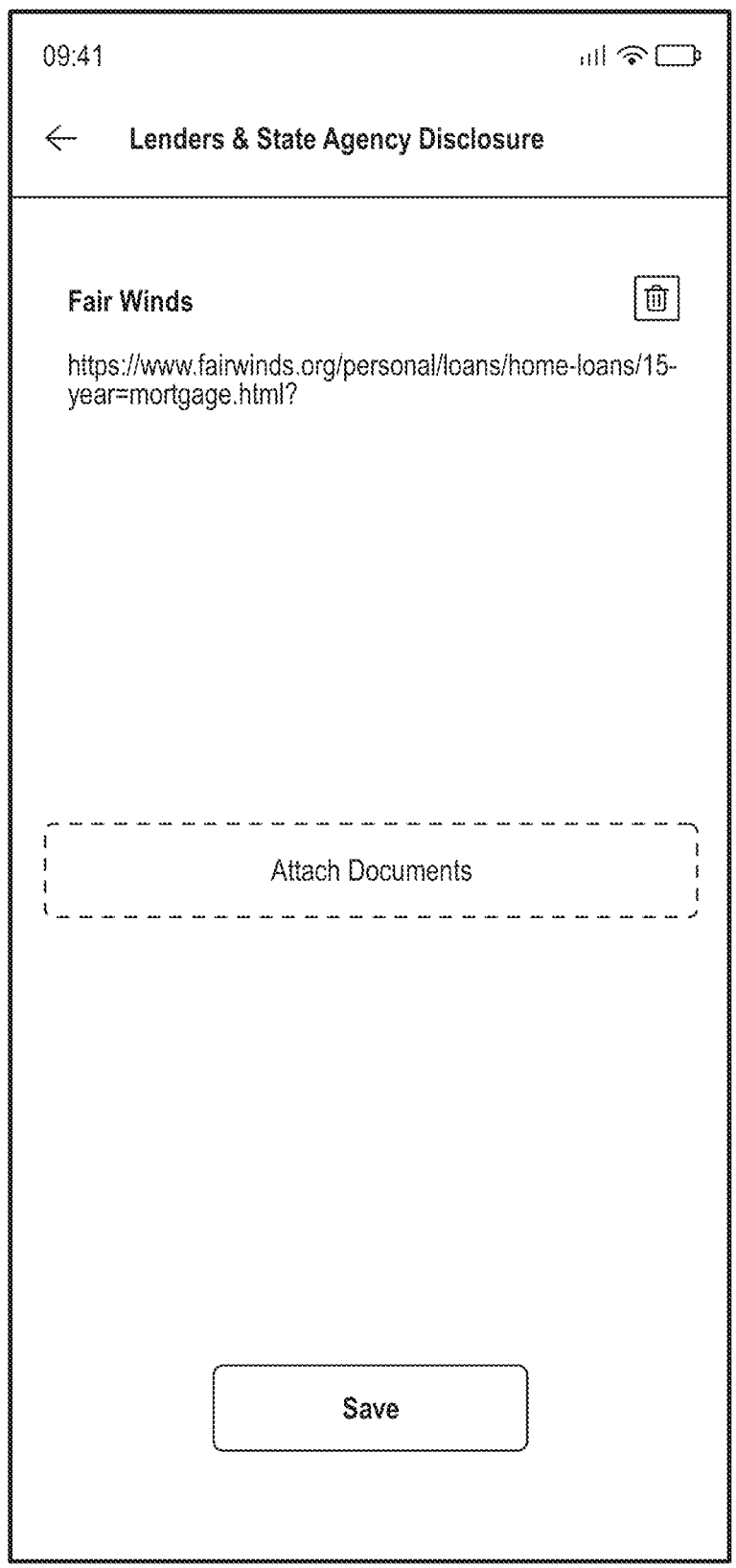
FIG. 18 depicts a screenshot of the Lenders and State Agency Disclosure interface.

FIG. 18 depicts a screenshot of the lenders and state agency disclosure interface. This section shares the links for ease of prospects to the lender's loan application. The links are added or recommended from the Real Estate Agent's side. Also, there is an option to upload an Agency disclosure document. Links and Documents both are shared with Prospects in the same section on Prospect's side application.

Settings

Figure 19:
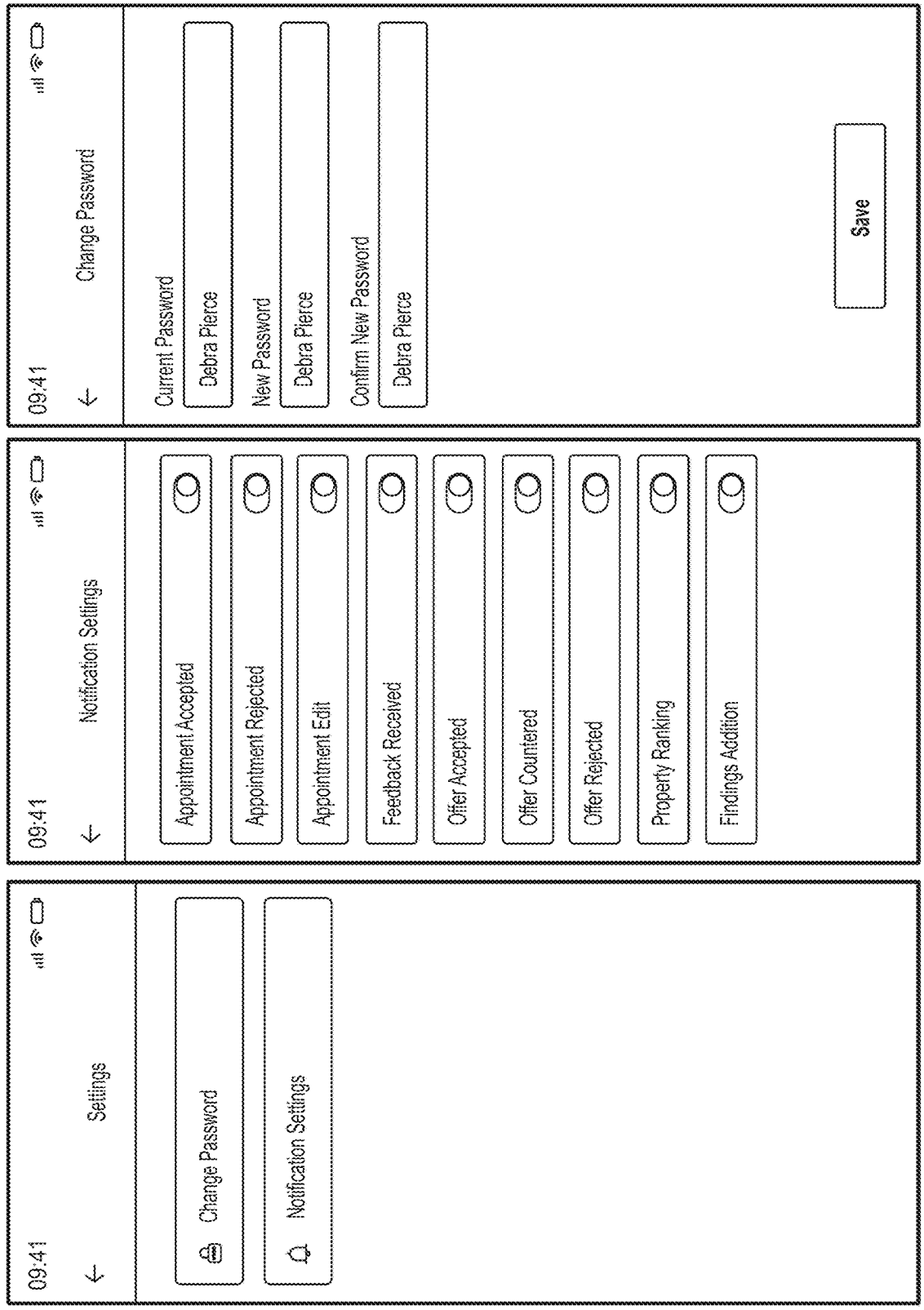
FIG. 19 depicts various screenshots of the Settings interface.

FIG. 19 depicts various screenshots of the settings interface. This section has the following two options: Change Password and Notifications.

Change Password

In this section, Users will be able to replace their old password with the new one by entering the following details: Old Password, New Password and Confirm Password.

Notifications

There will be a toggle button which the Real Estate Agent has the option to select On/Off of the Notifications.

About

Figure 20:
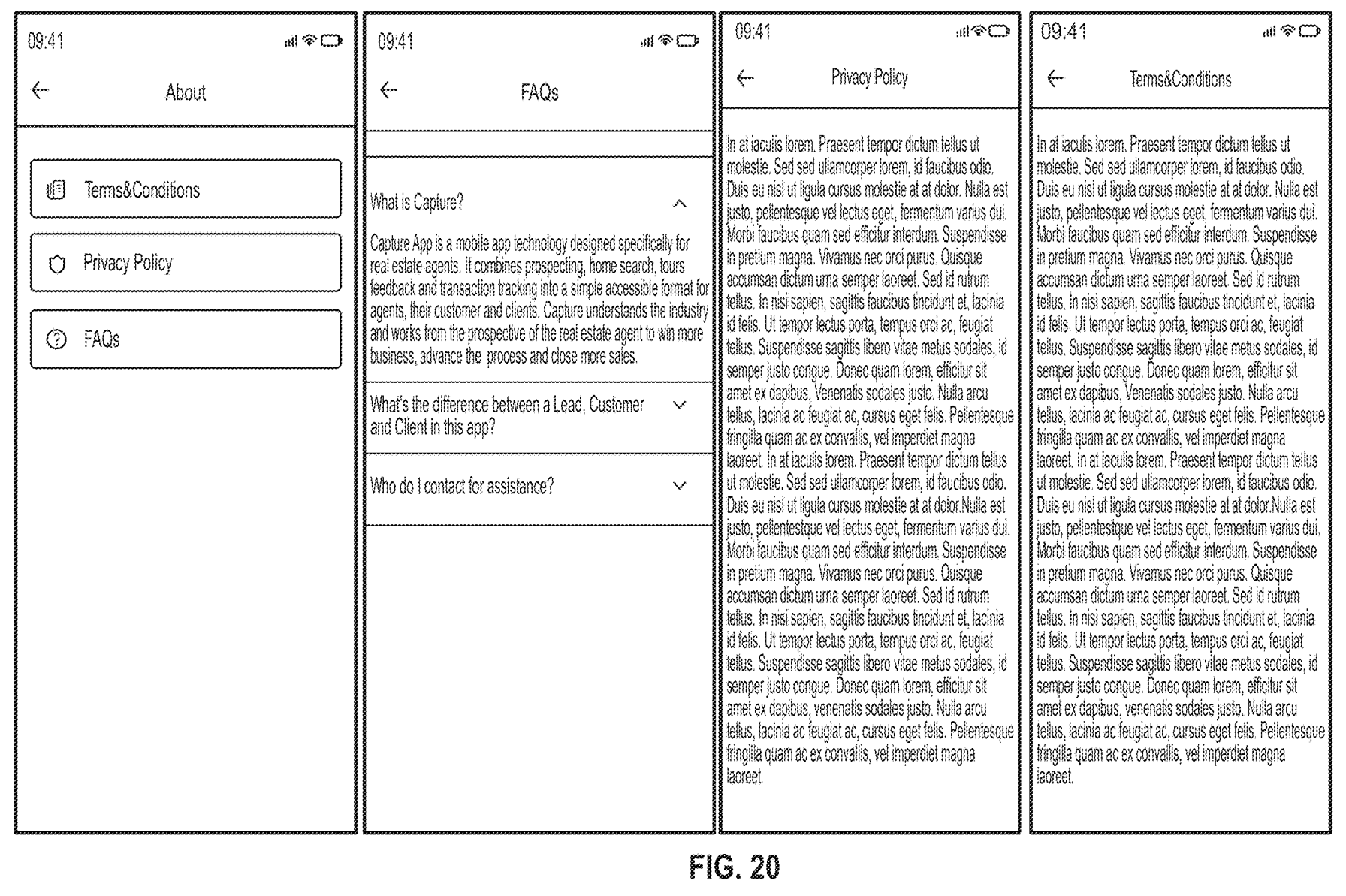

FIG. 20 depicts various screenshots of the about, FAQs, Privacy Policy, and Terms & Conditions interfaces. The About Us section has the static content of the application, which is mentioned below:

Terms and Conditions: This section will include the terms & conditions related to the mobile application Privacy Policy: This section will include the privacy policies of the mobile application FAQs: This section will include the FAQs of the mobile application Logout Real Estate Agents/Agents will be able to log out of the mobile application whenever required.

General User—Real Estate Agent's Client Application

User Authentication

Sign-In

Figure 21:
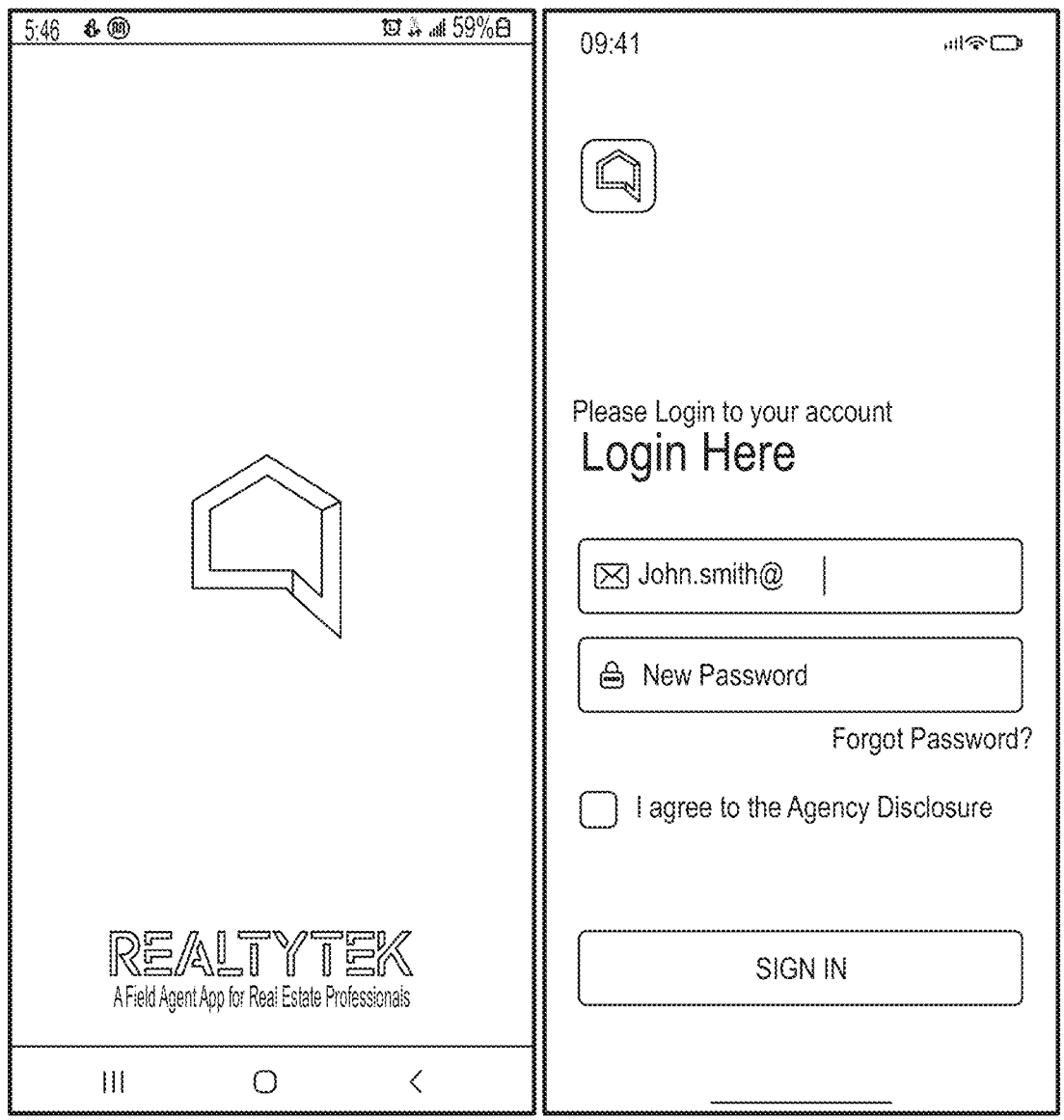
FIG. 21 depicts various screenshots of the general user authentication interface.

FIG. 21 depicts various screenshots of the general user authentication interface. When the Real Estate Agent registers the client on his contact, the client receives an email or text message containing the email and password. Using the email and password he/she can login to the application by agreeing on the agency disclosure document. Sign-In is necessary to use the application.

| Fields | Validations | Example |
| --- | --- | --- |
| Email Address | This field will accept Alphabets, Numbers, and Symbols. The standard email validations will also apply, i.e., email addresses consist of a local part, the "@" symbol, and the domain respectively. | "johndoe94@gmail.com" |
| Password | This field will accept Alphabets, Numbers, and Symbols. | "Johnabc123@" |

Forgot Password

The application will include the 'Forgot Password' functionality, which can be used if any user forgets their password. If the user forgets their password, there will be a "Forgot Password?" CTA present on the Login Screen which, when clicked, the user will be asked for the email address they used to register the application. The user will enter their email address, submit it; then the email address will be authenticated and an email will be sent to that email address in which there will be a randomly generated password to access their account and a message to change their password as soon as possible.

Bottom Navigation

Home/Dashboard

Figure 22:
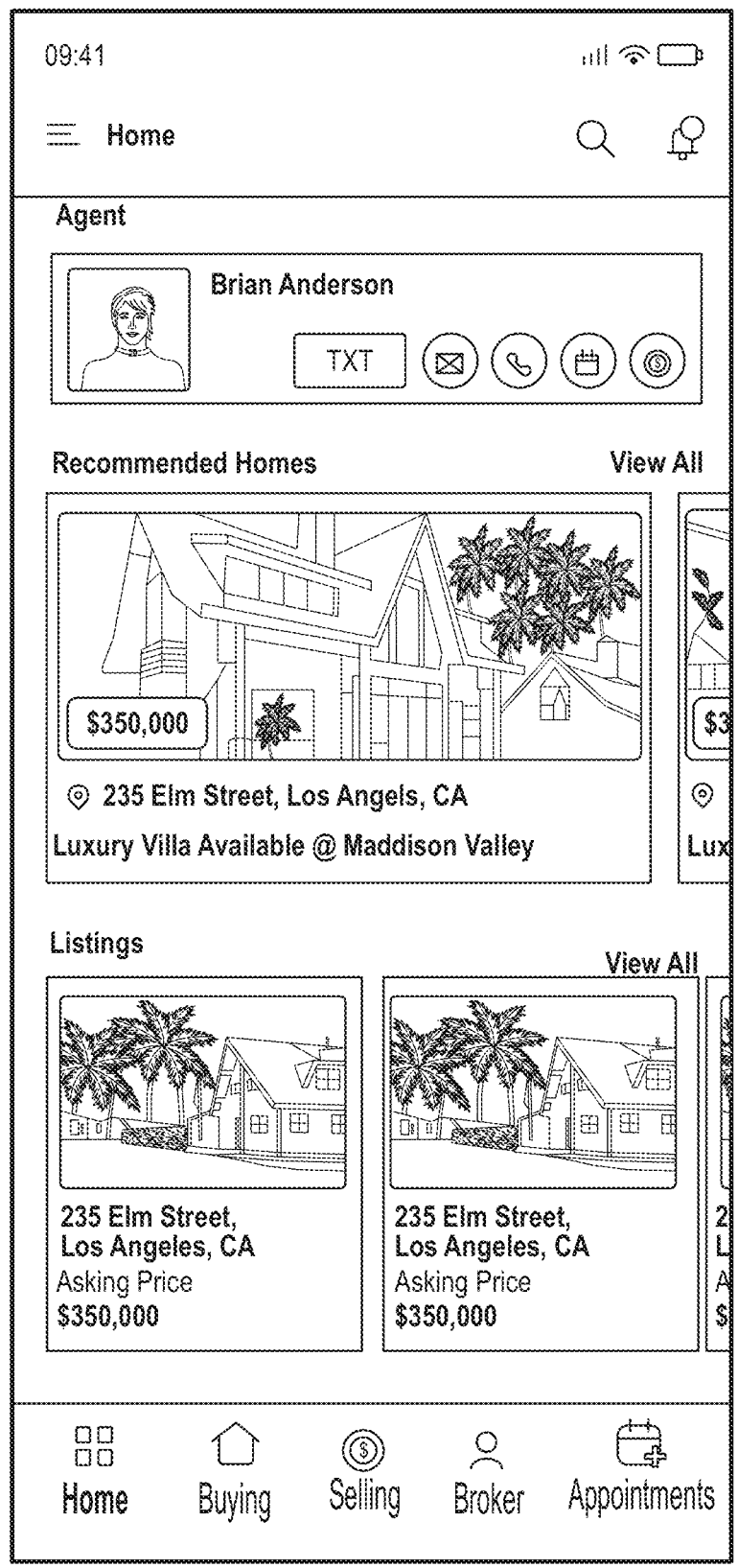
FIG. 22 depicts a screenshot of the customer-side home/dashboard interface.

FIG. 22 depicts a screenshot of the home/dashboard interface. The home page of the application works as a dashboard, for quick redirection on the following sections/screens:

Agent: The Agent/Real Estate Agent's name and his CTA buttons (call, text, email, calendar, and preapproved) will be shown in this section, who invites the prospect. Call, text and email will be redirected to the default call, text and email option whereas, the calendar will redirect to the "Agent's Calendar" where they can see the available dates for the appointment and the pre-approved button will redirect to the "Pre-Approved and Lenders" section.

Recommended Homes: Homes are recommended against any buying query from the Real Estate Agent's side will be shown here.

Listings (or Select Listings): Property add by either Real Estate Agent or Prospect will be shown on the Listings (or Select Listings) section.

Buying

The second option is buying, where the buying cards will be shown as added from the Real Estate Agent's side. The user will also have an option to add the query by providing the following details:

Agent: The agent's name will be mentioned by default, who invites the prospect

Customer/Prospect street address, city, state and zip

Requirements: The descriptive requirement, against the user preferences like, how many beds and bathrooms are required, etc.

Price Range: "Up to" amount to be input

House Type: Dropdown (Single Family (SF), Condo (C), Townhome (TH), Farm (F), Land (L), Rental (R))

Timeframe: When would you like to move: Dropdown (As soon as possible, 90 Days, 4-6 Months, 6-12 Months First Time Home Buyer: Dropdown (Yes/No)

Pre-Approved: Dropdown (Yes/No)

After adding these details, the card will be shown on both sides (Real Estate Agent and Customer/Prospect). When the user taps on the card, it will take them to the detailed page.

Buying Details

Figure 23:
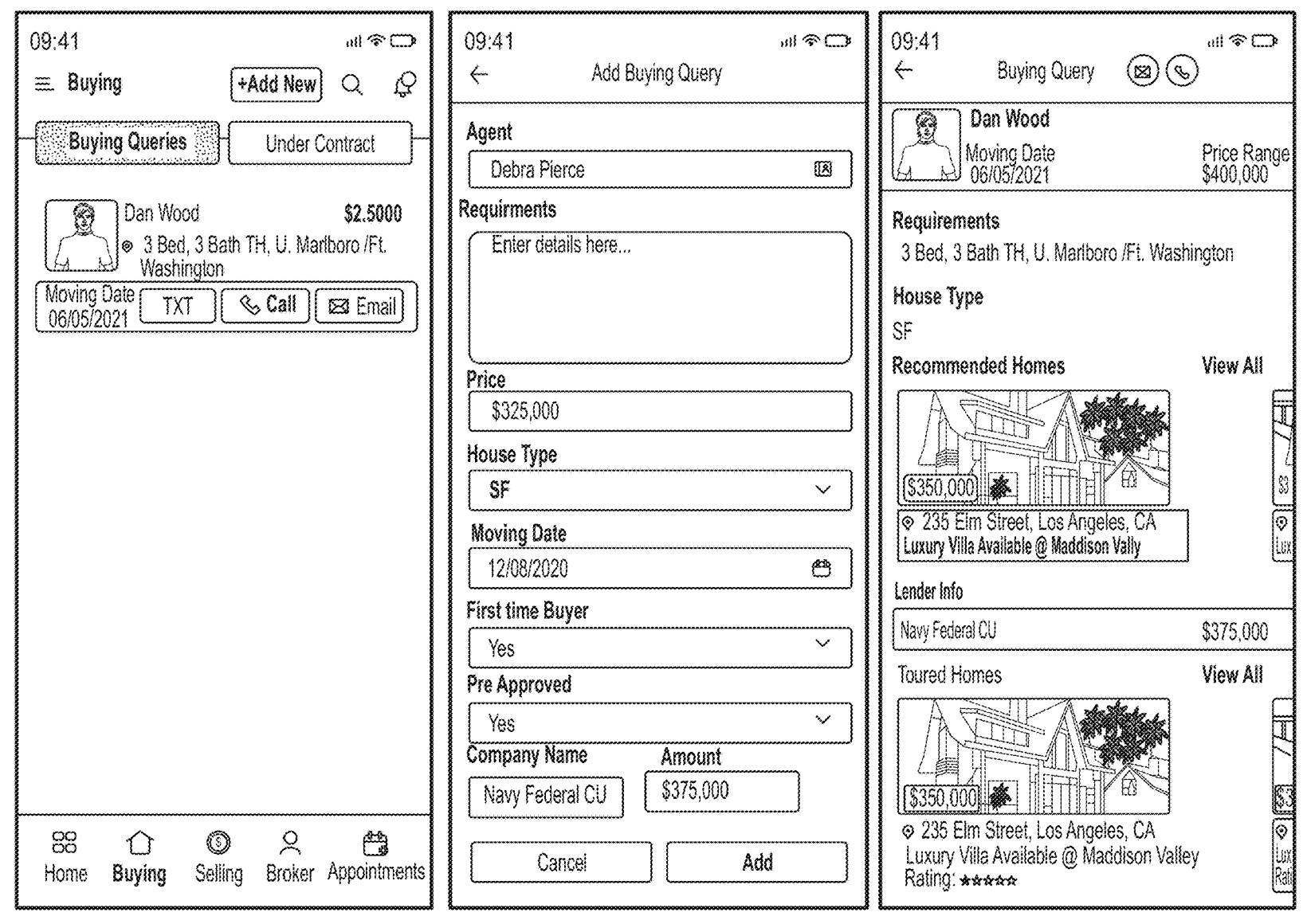

FIG. 23 depicts various screenshots of the buying details interface. The detailed page contains the Agent's Info and his CTA (call, text, email) which takes the user to the default call, text and email option, and the information filled at the time of adding a buying query. In addition, there are two sections: 1) Recommended Homes, and 2) Toured Homes.

Figure 24:
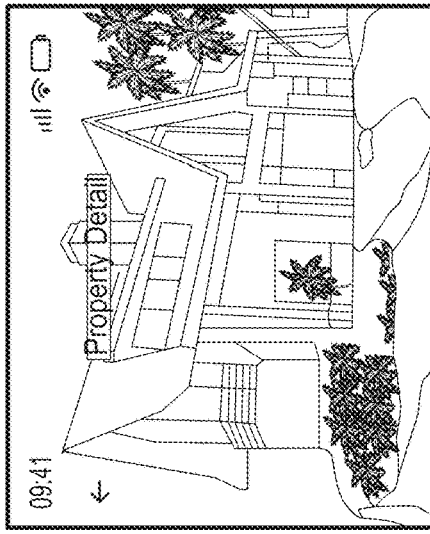
FIG. 24 depicts various screenshots of the customer-side Recommended Homes and Toured Homes interface.
Figure 24:
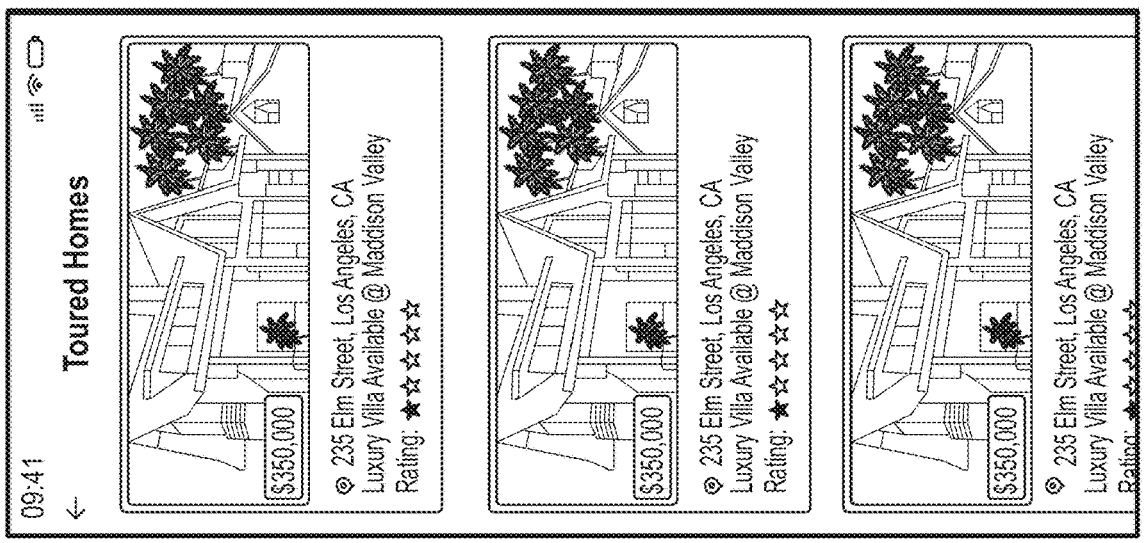
Figure 24:
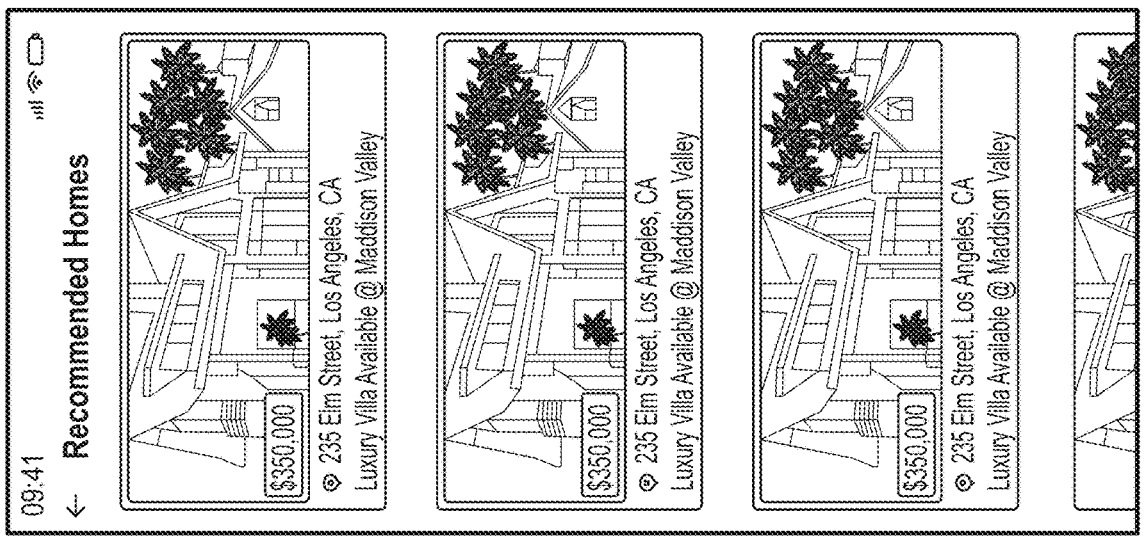

FIG. 24 depicts various screenshots of the recommended homes and toured homes interface.

Recommended Homes

Recommended homes are added by the Agent side while adding the buying query or later. Prospects can see the recommended homes and ask for an appointment by pressing the schedule button. There will be an option to see all the recommended homes in a list view. The cards of each recommended home will be shown. Once the user taps on schedule an appointment against the selected property, they need to select the date and time and press the confirm button. The appointment goes to the Real Estate Agent's side.

Toured Homes

The look and feel for the Toured Homes are the same as the Recommended Homes. The only difference is they are driven from Recommended Homes. Once the user visits any property that is scheduled, so after visiting, the property will move from Recommended homes to Toured homes and now the user has the option to give ratings and feedback.

Under Contract

Figure 25:
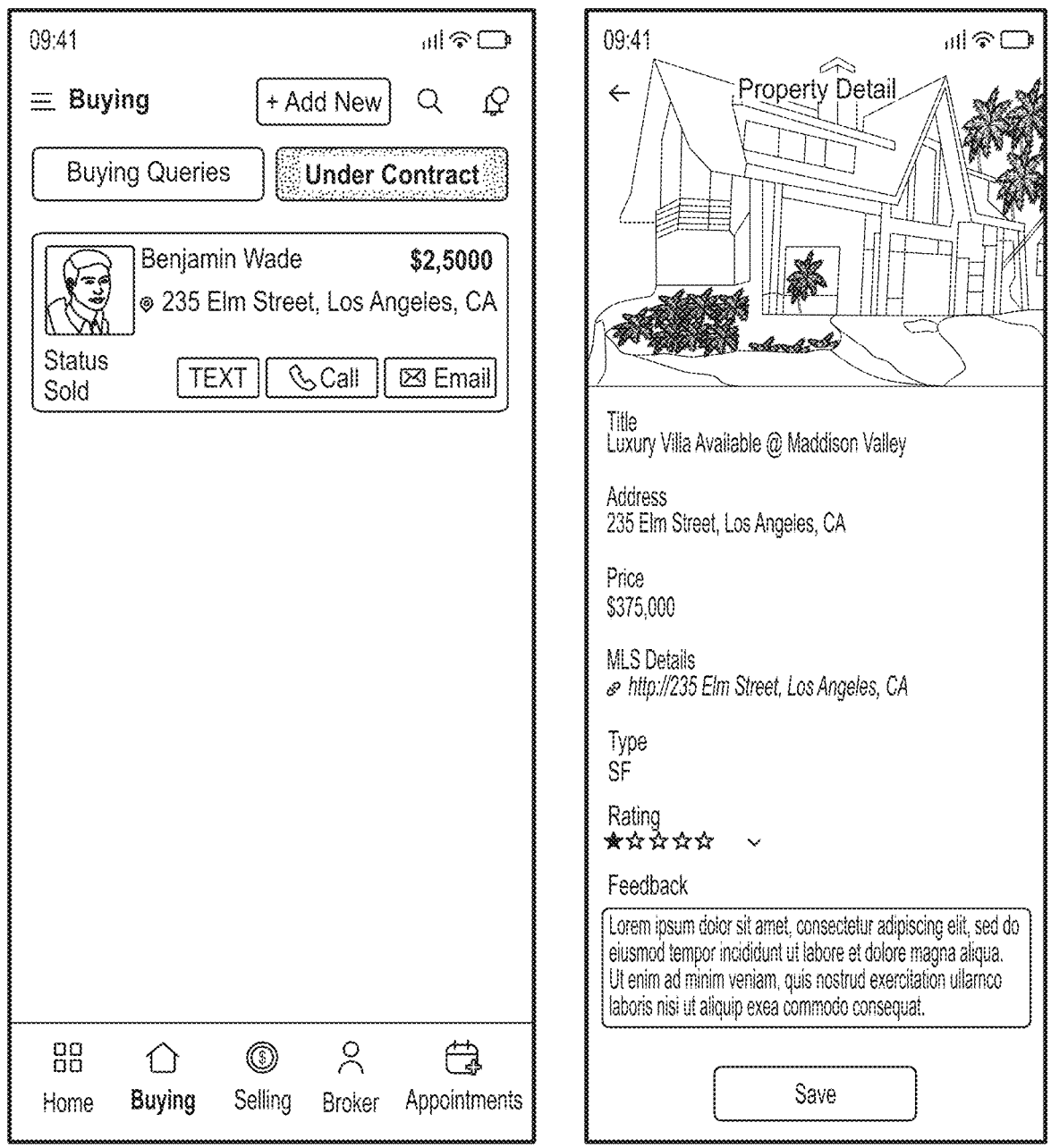
FIG. 25 depicts various screenshots of the Under Contract interface.

FIG. 25 depicts various screenshots of the Under Contract interface. For toured properties, initiate contract button is pressed by the client or agent and property is under contract and will be shown on the Under Contract section, along with the contractual dates and property information. All the details are the same as Agent's side, but the Client can only view these details.

Contract Details

Figure 26:
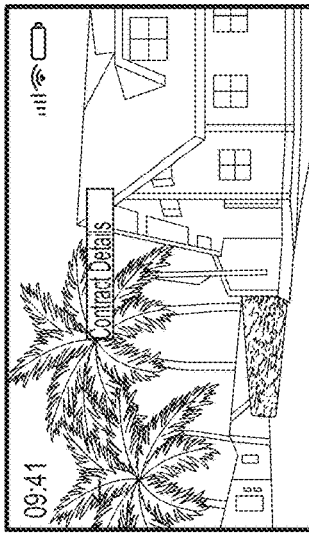
FIG. 26 depicts various screenshots of the Contract Details interface.
Figure 26:
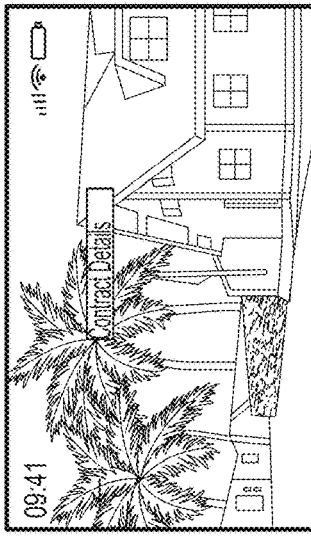
Figure 26:
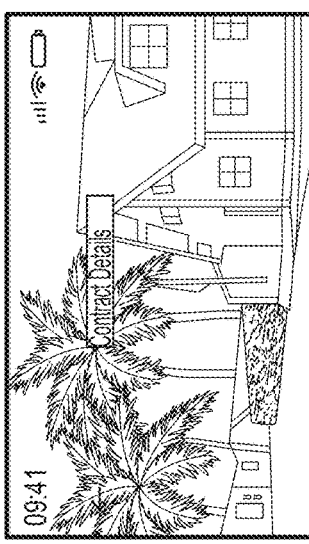

FIG. 26 depicts various screenshots of the contract details interface. The detailed section has the following info: Property Title, Address, Price, MLS Details, Type, Rating and Comments (Editable).

Contract Status

The Real Estate Agents can update the dates against each contract status which will be viewable in this section.

Contract Offered
Contract Countered
Contract Accepted
Contract Executed
Contract Declined
Inspection
Appraisal
Final Walk-thru
Settlement Date
Add Comments
Lender Info/Loan Status The loan details have the following information, which is also viewable by the Real Estate Agent's client: Company, Contact, Sale Price, Financing, EMD Submitted, and Down Payment.

Selling

Figure 27:
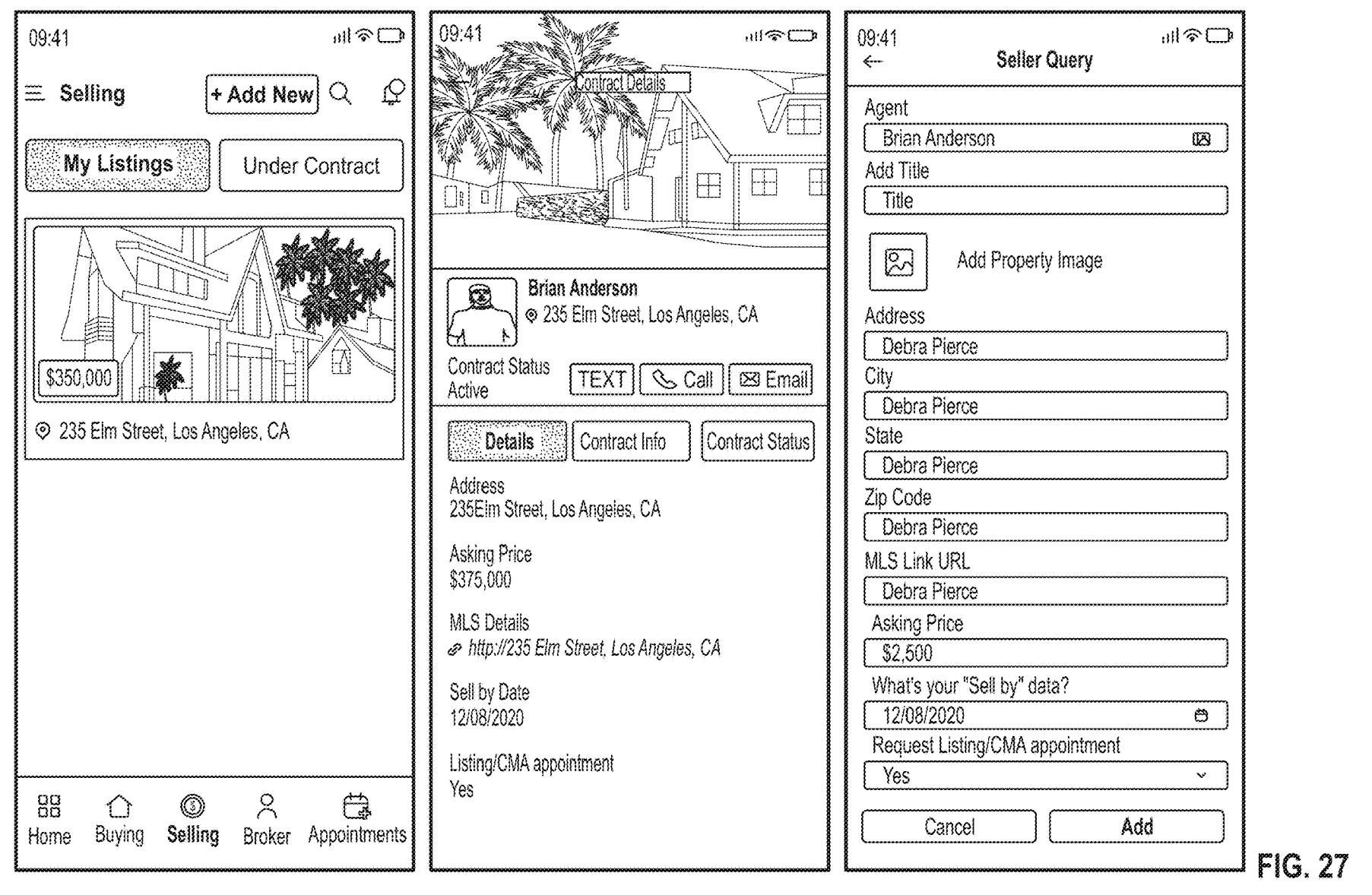

FIG. 27 depicts various screenshots of the selling interface. Users who would like to sell their properties will utilize this section. They have an option to add their property details, and like the buying query, this was named as a selling query which will turn into the form of cards (Listing) at the selling section.

Add Selling Query

To add the listing, the user needs to fill in the following details: Agents: The agent's name, who invited the prospect, will be mentioned by default, Street Address, City, Zip Code, MLS Details (if available) filled in by agent, Asking Price, What is your "Sell by" Date, and Request Listings/CMA Appointment.

The property will be added to the listing section of the Real Estate Agent's side so it can be used by the Agent for recommending the property to the other prospects. If the property is sold by the Real Estate Agent, then they will add the contractual date and the property will be moved to the under contract section.

Under Contract

The properties under contact will have the following options.

Details

Figure 28:
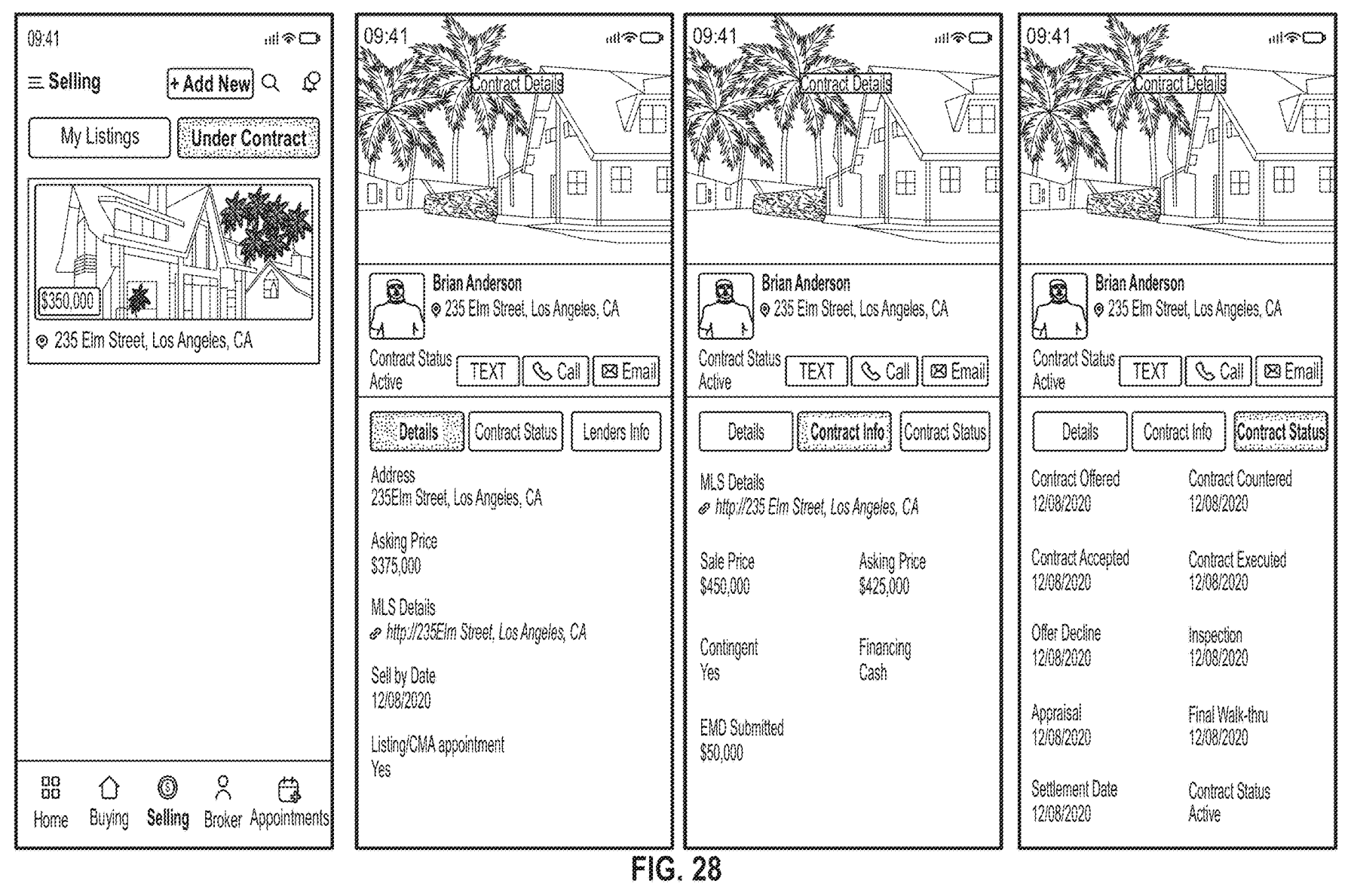

FIG. 28 depicts various screenshots of the contract details interface. The detailed section has the following info: Property Title, Address, Price, MLS Details, Sell by Date, and Listing/CMA Appointment.

Contact Status

The Real Estate Agent can update the dates against each contract status (Contract Offered, Contract Countered, Contract Accepted, Contract Executed, Contract Declined, Inspection, Appraisal, Final Walk-Thru, Settlement Date, and Add Comments) which will be viewable in this section.

Loan Status

The loan details have the following information, which is also viewable by the Real Estate Agent's client: Company, Contract, Sale Price, Financing, EMD Submitted, and Down Payment.

Agent's Business Card

Figure 29:
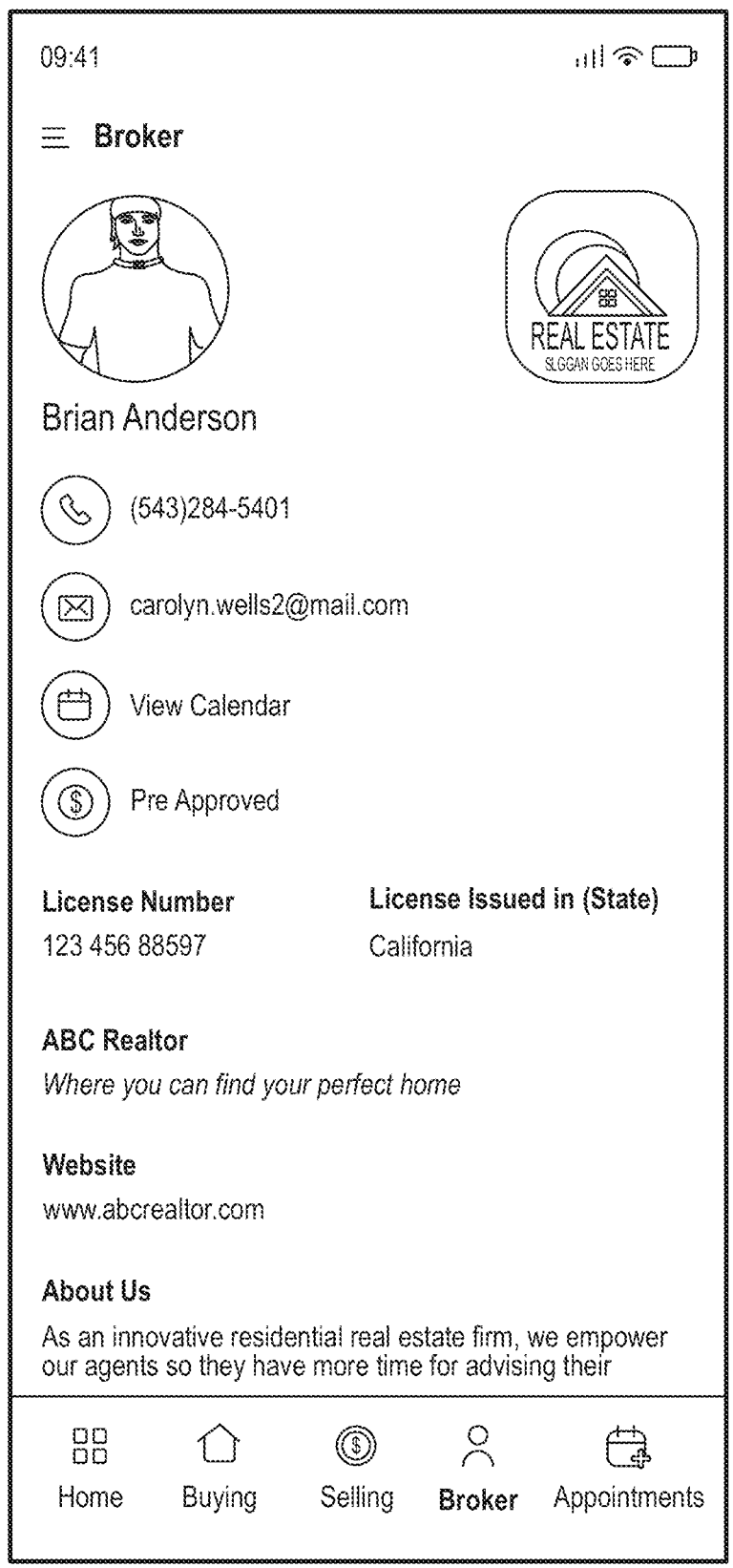
FIG. 29 depicts a screenshot of the Real Estate Agent's business card interface.

FIG. 29 depicts a screenshot of the agent's business card interface. The agent's business card will be shown on the customer side. They have a default sharing option. This is for word of mouth, so the client can recommend the Real Estate Agent to his or her circle.

Appointment

Figure 30:
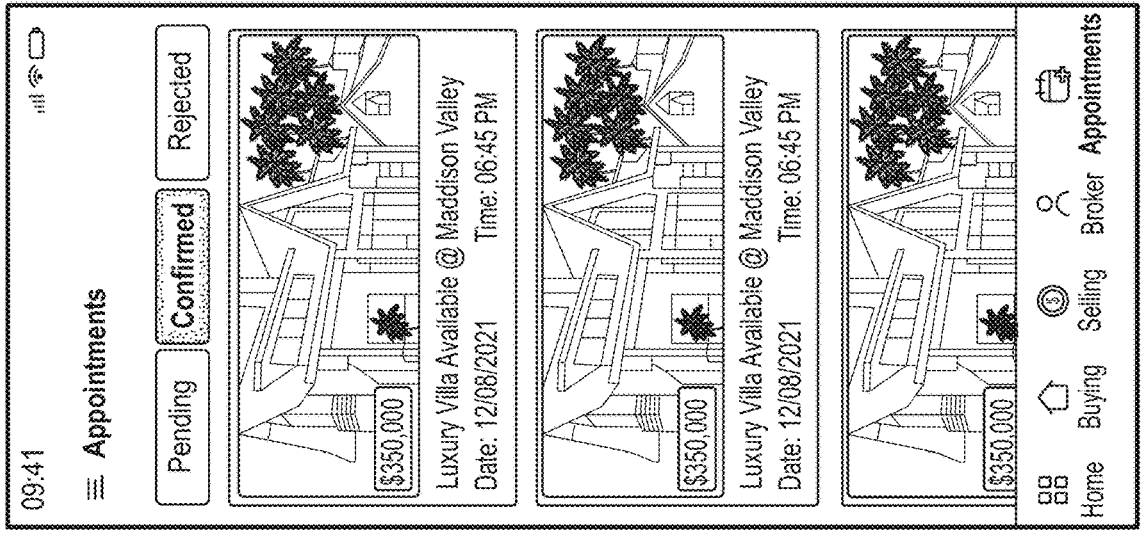
FIG. 30 depicts various screenshots of the Appointments interface.
Figure 30:
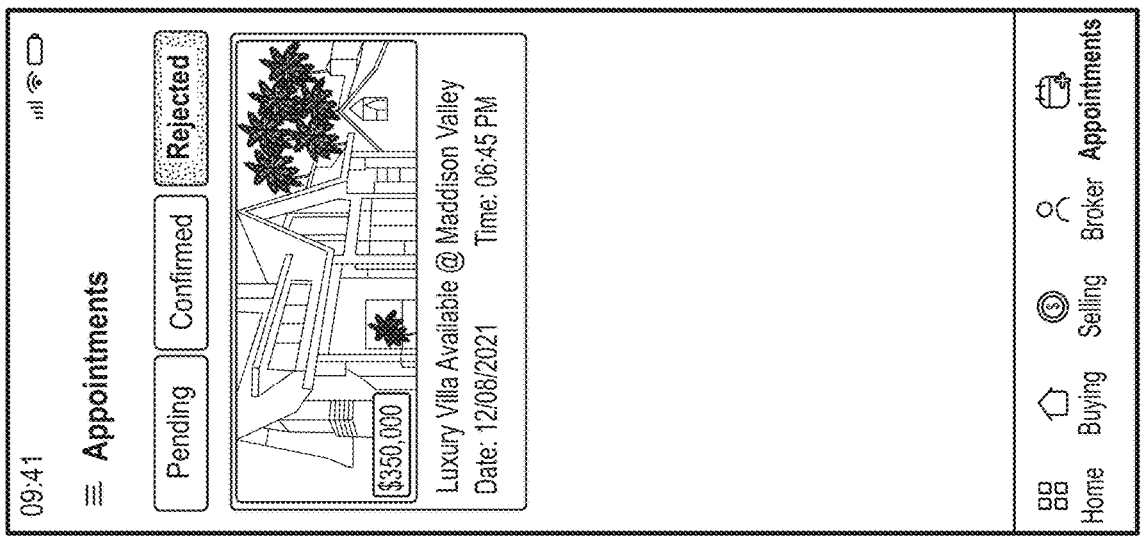
Figure 30:
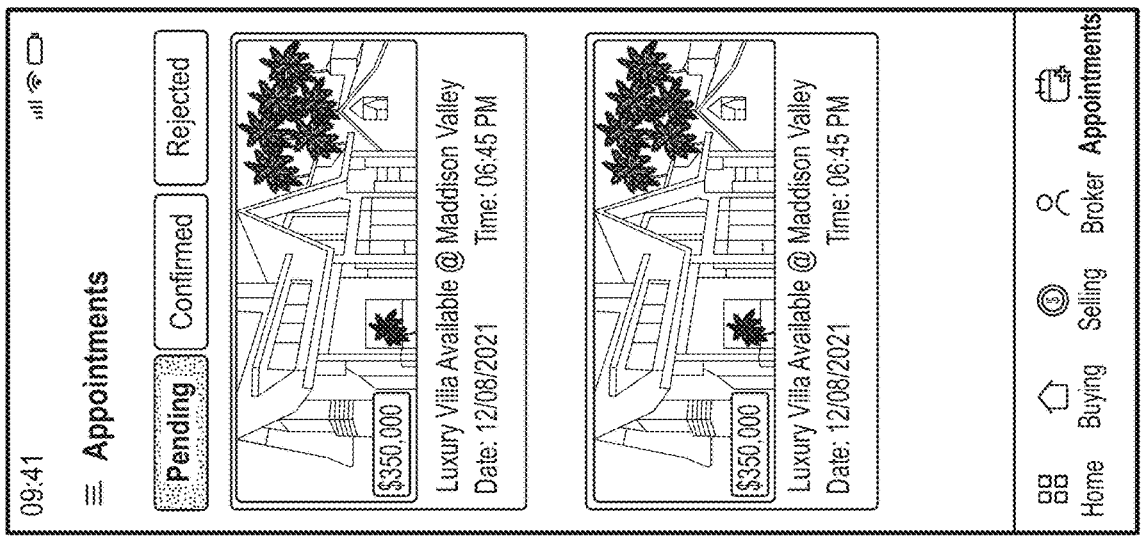

FIG. 30 depicts various screenshots of the appointment interface. Prospects/Customers who are interested in a property will ask for an appointment with a Real Estate Agent from their recommended homes. The appointments have three sections, based on the appointment statuses: Pending: the appointments are not accepted yet, will be pending;

Confirmed: the accepted appointments are listing in the confirmed section; Rejected: the appointments rejected from the Real Estate Agent's side will be listing in the rejected section.

Side Menu

Figure 31:
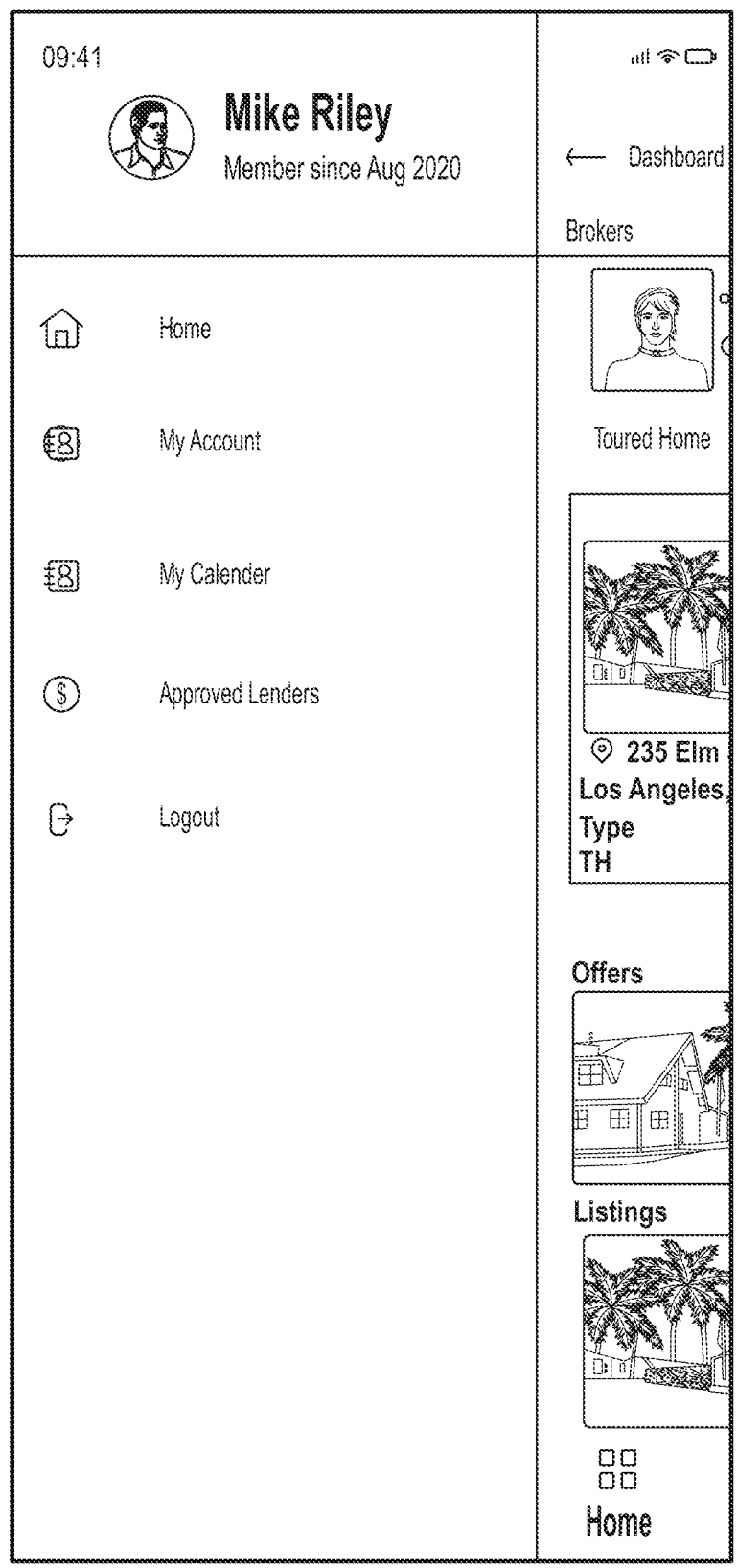
FIG. 31 depicts a screenshot depicting the customer-side side menu.

FIG. 31 depicts a screenshot showing the side menu. The side menu consists of the following options: Home, My Account, My Calendar, Approved Lenders, and Logout.

My Accounts

While adding the prospect, the Agent enters the customer details. These details are editable except for the email. The email address will be the unique identifier.

Edit Profile

Prospects can edit their details added by the agent initially. They can change their profile picture, update their name, address and phone number but the email address will remain uneditable. The email address will act as a unique identifier.

Change Password

In this section, Users will be able to replace their old password with the new one by entering the following details: Old Password, New Password, and Confirm Password.

Figure 32:
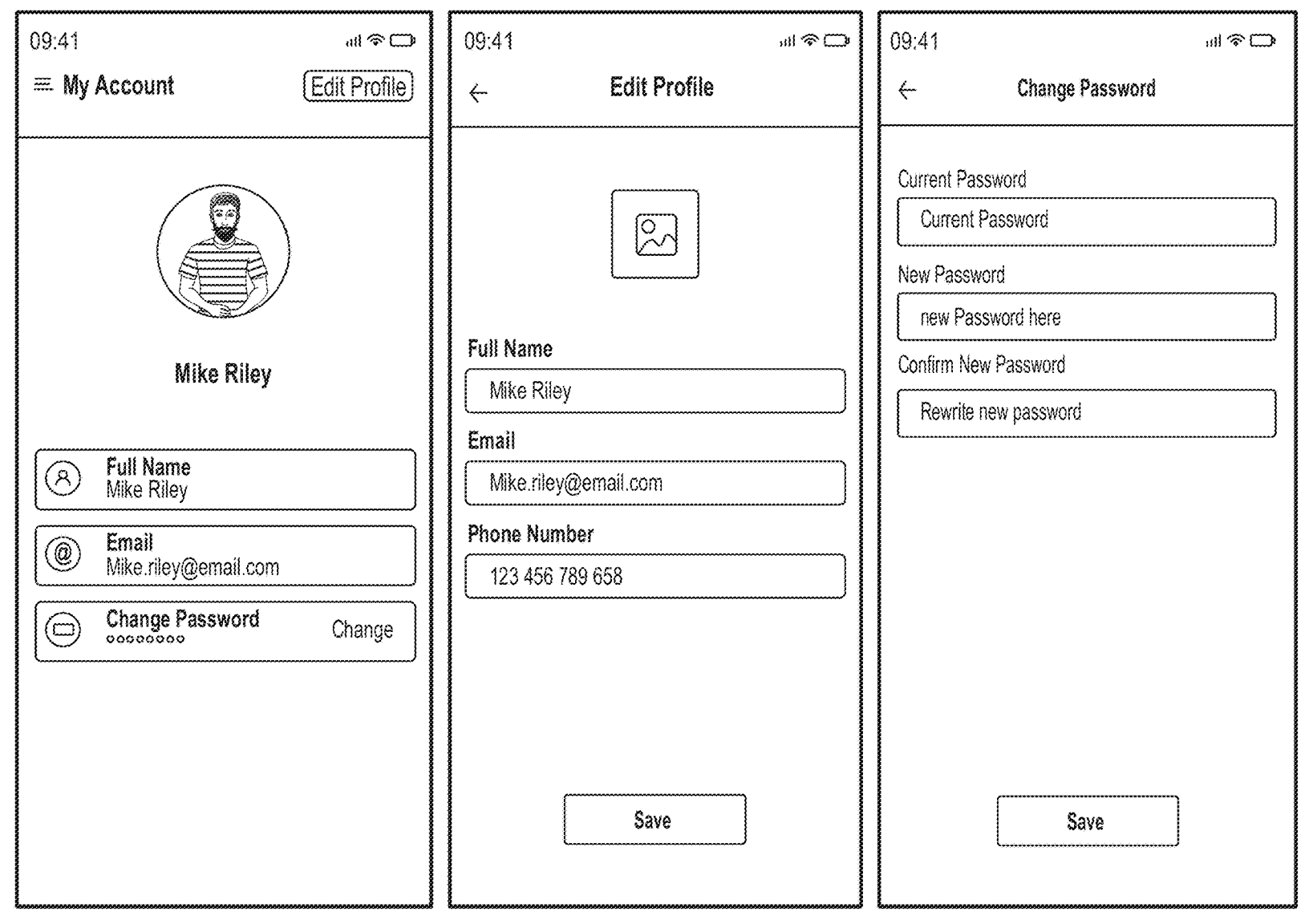

FIG. 32 depicts various screenshots of my account, edit profile, edit profile and change password interfaces.

My Calendar

Figure 33:
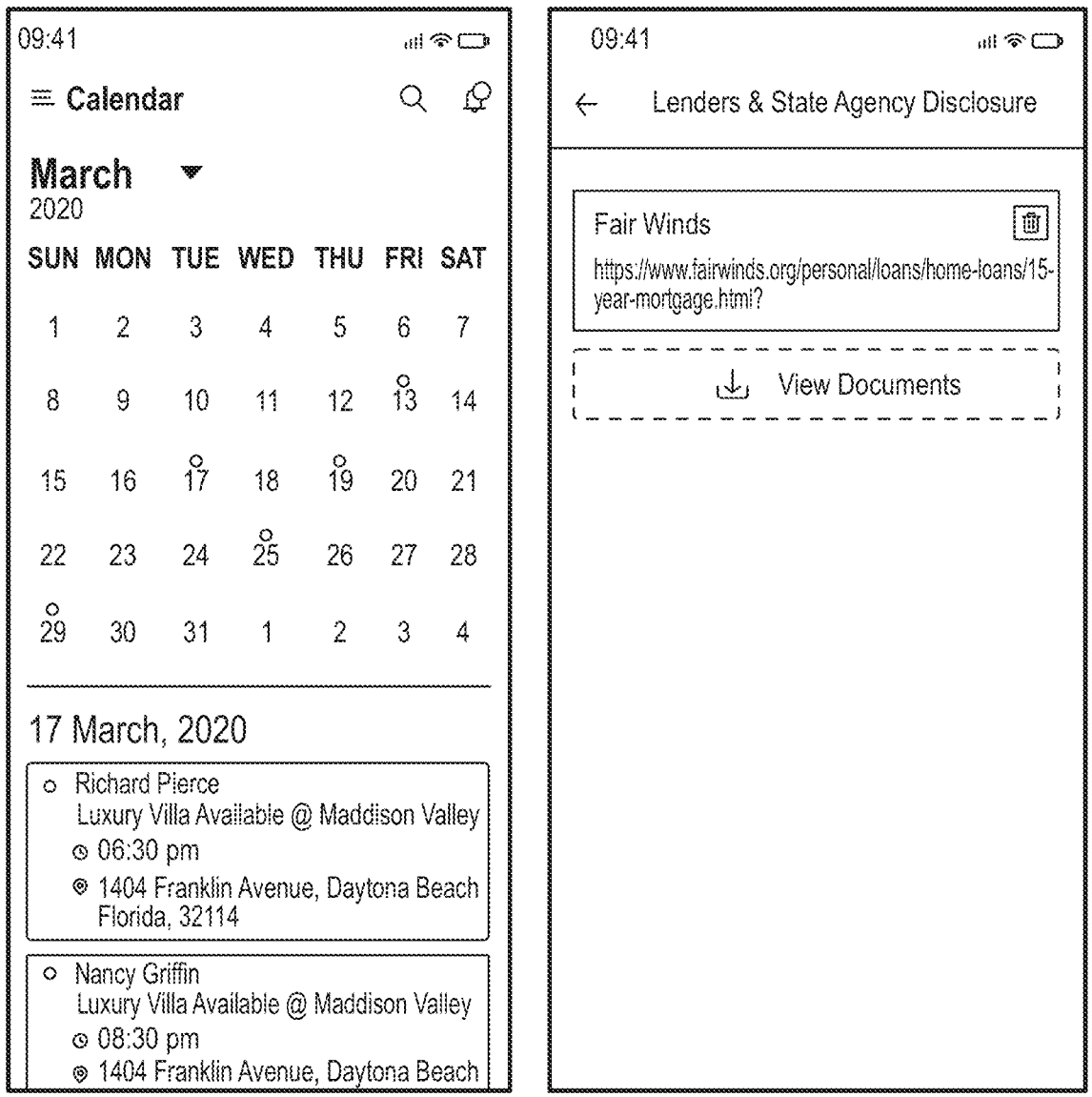
FIG. 33 depicts various screenshots of the Calendar interface and approved lenders interface.

FIG. 33 depicts various screenshots of the calendar interface and approved lenders interface. The customer can check out their appointment from My Calendar section. The date having an appointment will be notified with the dot and the details including property title, time, address and the Real Estate Agent's name will be mentioned on the scheduled date.

Approved Lenders

This section shared the links for ease of prospects to get the loan. The links are approved or recommended from the Real Estate Agent's side. Also, there is an option to download an agent's state Agency disclosure document uploaded from the Real Estate Agent's side.

Logout

Customer/Prospects will be able to logout of the mobile application whenever required.

Notifications

This feature will allow the users to get notifications from the application about the important events of the application. A Third-Party service may be required to achieve the push notifications functionality.

Super Admin Panel

Login

The admin will be able to login using email and password.

User Management

The Super Administrator will be able to manage the users of the application with the following functionalities: View List of Users, Subscribed Users, Add Users, Edit Users, Delete Users, Activate/Deactivate Users.

Static Content Management

The Super Administrator will be able to manage the static content (FAQs, Terms and Conditions, Privacy Policies) of the application with the following functionalities: View Content, Edit Content, Add (Upload) Content, Activate/Deactivate Content.

Logout

The administrator will be able to logout from the web panel whenever required.

Technology Stack

The mobile application will be developed for both iOS® and Android® platforms using, for example, the React Native framework.

Figure 34:
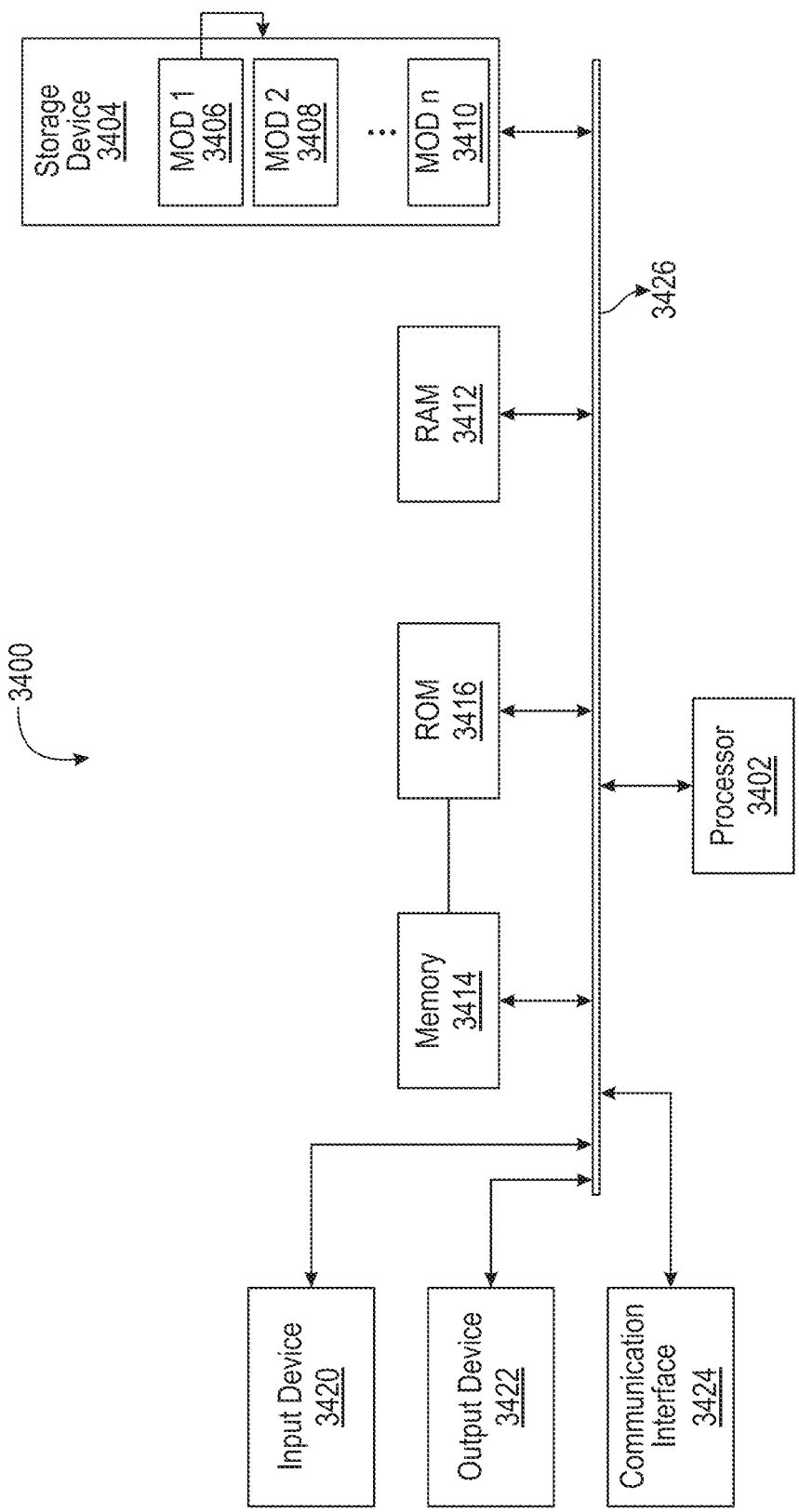
FIG. 34 depicts a non-limiting example of a system implementing the method of the present invention.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 3400 shown in FIG. 34 can practice all or part of the recited methods, can be a part of the recited systems, and/or can operate according to instructions in the recited non-transitory computer-readable storage media. With reference to FIG. 34, an exemplary system includes a general-purpose computing device 3400, including a processing unit (e.g., CPU) 3402 and a system bus 3426 that couples various system components including the system memory such as read only memory (ROM) 3416 and random access memory (RAM) 3412 to the processing unit 3402. Other system memory 3414 may be available for use as well. It can be appreciated that the invention may operate on a computing device with more than one processing unit 3402 or on a group or cluster of computing devices networked together to provide greater processing capability. A processing unit 3402 can include a general purpose CPU controlled by software as well as a special-purpose processor.

The computing device 3400 further includes storage devices such as a storage device 3404 such as, but not limited to, a magnetic disk drive, an optical disk drive, tape drive or the like. The storage device 3404 may be connected to the system bus 3426 by a drive interface. The drives and the associated computer readable media provide nonvolatile storage of computer readable instructions, data structures, program modules and other data for the computing device 3400. In one aspect, a hardware module that performs a particular function includes the software component stored in a tangible computer-readable medium in connection with the necessary hardware components, such as the CPU, bus, display, and so forth, to carry out the function. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 3400, an input device 3420 represents any number of input mechanisms, such as a microphone for speech, a touch-sensitive screen for gesture or graphical input, keyboard, mouse, motion input, speech and so forth. The output device 3422 can also be one or more of a number of output mechanisms known to those of skill in the art. In some instances, multimodal systems enable a user to provide multiple types of input to communicate with the computing device 3400. The communications interface 3424 generally governs and manages the user input and system output. There is no restriction on the invention operating on any particular hardware arrangement and therefore the basic features here may easily be substituted for improved hardware or firmware arrangements as they are developed.

Logical operations can be implemented as modules configured to control the processor 3402 to perform particular functions according to the programming of the module. FIG. 34 also illustrates three modules MOD 1 3406, MOD 2 3408 and MOD 3 3410, which are modules controlling the processor 3402 to perform particular steps or a series of steps. These modules may be stored on the storage device 3404 and loaded into RAM 3412 or memory 3414 at runtime or may be stored as would be known in the art in other computer-readable memory locations.

Modules MOD 1 3406, MOD 2 3408 and MOD 3 3410 may, for example, be modules controlling the processor 3402 to perform the following steps: (a) when the real estate agent is not previously registered, displaying, in the display, a first user interface for registering a real estate agent; (b) when the real estate agent is previously registered, displaying, in the display, a second user interface for logging in the real estate agent; (c) displaying, in the display, a third user interface for depicting a home/dashboard for quick redirection on the following sections/screens: recently added buyers displayed with call, text and email buttons and recently added properties along with call, text and email buttons; (d) displaying, in the display, a fourth user interface for depicting any of, or a combination of, the following information associated with one or more customers/prospects: leads information for onboarding prospects by getting simple information, buyer information on clients interested in purchasing properties, and contract information on properties of clients that are under contract; (e) displaying, in the display, a fifth interface depicting an e-business card; (f) displaying, in the display, a sixth interface depicting a calendar; (g) displaying, in the display, a seventh interface for entering subscription information; and (h) displaying, in the display, an eighth interface for managing notification settings.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor. By way of example, and not limitation, such non-transitory computer-readable media can include flash memory, RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. The computer readable media does not include carrier waves and electronic signals passing wirelessly or over wired connections.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media).

Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable BluRay® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase, for example, an "aspect" does not imply that the aspect is essential to the subject technology or that the aspect applies to all configurations of the subject technology. A disclosure relating to an aspect may apply to all configurations, or one or more configurations. A phrase, for example, an aspect may refer to one or more aspects and vice versa. A phrase, for example, a "configuration" does not imply that such configuration is essential to the subject technology or that such configuration applies to all configurations of the subject technology. A disclosure relating to a configuration may apply to all configurations, or one or more configurations. A phrase, for example, a configuration may refer to one or more configurations and vice versa.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As noted above, particular embodiments of the subject matter have been described, but other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

CONCLUSION

A system and method have been shown in the above embodiments for the effective implementation of a system, method and article of manufacture for registration and prospecting mobile application for real estate sales. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/program, computing environment, or specific computing hardware.

The invention claimed is:

1. An electronic device, comprising:
   (a) a display;
   (b) a touch-sensitive surface;
   (c) one or more processors;
   (d) memory; and
   (e) one or more programs implementing a customer relationship management (CRM) for a real estate agent, wherein the one or more programs are stored in the memory and configured to be executed by the one or more processors, the one or more programs including instructions for:
      (1) when the real estate agent is not previously registered, displaying, in the display, a first user interface for registering a real estate agent;
      (2) when the real estate agent is previously registered, displaying, in the display, a second user interface for logging in the real estate agent;
      (3) displaying, in the display, a third user interface for depicting a home/dashboard for quick redirection on the following sections/screens: added buyers displayed with call, text and email buttons and added properties along with call, text and email buttons;
      (4) displaying, in the display, a fourth user interface for depicting any of, or a combination of, the following information associated with one or more leads/prospects, customers and clients: leads information for onboarding prospects, buyer information on clients interested in purchasing properties, and contract information on properties of clients that are selling properties;
      (5) displaying, in the display, a sixth interface depicting lenders and state agency disclosure, the sixth interface enabling automatic agreement to the lenders and state agency disclosure upon logging into a client-side application; and
      (6) displaying, in the display, a seventh interface for recommending homes, wherein the CRM tracks a sales transaction process by: (1) automatically updating recommended homes that were toured to a listing of toured homes, and (2) automatically updating the listing of toured homes to another listing of homes under contract based on homes within the listing of toured homes that went under contract.

2. The electronic device of claim 1, wherein the one or more programs further including instructions for displaying, in the display, a fifth interface depicting an e-business card.

3. The electronic device of claim 1, wherein the one or more programs further including instructions for displaying, in the display, a sixth interface depicting a calendar.

4. The electronic device of claim 3, wherein the sixth interface depicting a calendar additionally depicts information on appointments including appointment date and property detail.

5. The electronic device of claim 1, wherein the one or more programs further including instructions for displaying, in the display, a seventh interface for entering subscription information.

6. The electronic device of claim 1, wherein the one or more programs further including instructions for displaying, in the display, an eighth interface for managing notification settings.

7. The electronic device of claim 6, wherein the eighth interface for managing notification settings comprises any of, or a combination of, the following notifications: appointments accepted, appointments rejected, appointments edited, feedback received, offer accepted, offer countered, offer rejected, property ranking, and findings addition.

8. The electronic device of claim 1, wherein the instructions displaying a plurality of fields for any of or a combination of the following information associated with a real estate agent during registering: name, email, phone number, license number, license state, agent's/broker's logo, agent's tagline, and agent's business address.

9. The electronic device of claim 1, wherein the fourth user interface, as part of the buyer information on clients interested in purchasing properties, displays to the real estate agent multiple buying queries in the form of one or more cards, wherein each card in the one or more cards displays a prospect's picture, one or more requirements, a price range, communication information, and a moving date.

10. The electronic device of claim 1, wherein the fourth user interface, as part of the buyer information on clients interested in purchasing properties, displays one or more input fields to receive a buying query for a given customer by the real estate agent, wherein the buying query indicates any of, or a combination of, the following: number of bedrooms, number of bathrooms, minimum price range, maximum price range, house type, move in date, information on whether the given customer is a first time home buyer, and information on whether the given customer is pre-approved for a loan.

11. The electronic device of claim 1, wherein the fourth user interface, as part of the buyer information on clients interested in purchasing properties, displays under contract information, any of, or combination of, the following: contract status, contract offered, contract countered, contract accepted, contract executed, contract declined, inspection information, appraisal information, final walk-through information, settlement date, and one or fields to add comments.

12. A non-transitory, computer accessible, memory medium storing program instructions for implementing a customer relationship management (CRM) for a real estate agent, wherein the one or more programs are stored in the memory and configured to be executed by the one or more processors, the medium comprising:
  (a) when the real estate agent is not previously registered, computer readable program code displaying, in the display, a first user interface for registering a real estate agent;
  (b) when the real estate agent is previously registered, computer readable program code displaying, in the display, a second user interface for logging in the real estate agent;
  (c) computer readable program code displaying, in the display, a third user interface for depicting a home/dashboard for quick redirection on the following sections/screens: added buyers displayed with call, text and email buttons and added properties along with call, text and email buttons; and
  (d) computer readable program code displaying, in the display, a fourth user interface for depicting any of, or a combination of, the following information associated with one or more leads/prospects, customers, and clients: leads information for onboarding prospects, buyer information on clients interested in purchasing properties, and contract information on properties of clients that are selling properties;
  (e) computer readable program code displaying, in the display, a sixth interface depicting lenders and state agency disclosure the sixth interface enabling automatic agreement to the lenders and state agency disclosure upon logging into a client-side application; and
  (f) computer readable program code displaying, in the display, a seventh interface for recommending homes, wherein the CRM tracks a sales transaction process by: (1) automatically updating recommended homes that were toured to a listing of toured homes, and (2) automatically updating the listing of toured homes to another listing of homes under contract based on homes within the listing of toured homes that went under contract.

13. The non-transitory, computer accessible, memory medium of claim 12, wherein the medium further comprises computer readable program code displaying, in the display, a fifth interface depicting an e-business card.

14. The non-transitory, computer accessible, memory medium of claim 12, wherein the medium further comprises computer readable program code displaying, in the display, a sixth interface depicting a calendar.

15. The non-transitory, computer accessible, memory medium of claim 14, wherein the sixth interface depicting a calendar additionally depicts information on appointments including appointment date and property detail.

16. The non-transitory, computer accessible, memory medium of claim 12, wherein the medium further comprises computer readable program code displaying, in the display, a seventh interface for entering subscription information.

17. The non-transitory, computer accessible, memory medium of claim 12, wherein the medium further comprises computer readable program code displaying, in the display, an eighth interface for managing notification settings.

18. The non-transitory, computer accessible, memory medium of claim 17, wherein notification settings are associated with any of, or a combination of, the following notifications:
  appointments accepted, appointments rejected, appointments edited, feedback received, offer accepted, offer countered, offer rejected, property ranking, and findings addition.

19. The non-transitory, computer accessible, memory medium of claim 12, wherein the instructions displaying a plurality of fields for any of or a combination of the following information associated with a real estate agent during registering: name, email, phone number, license number, license state, agent's logo, agent's tagline, and agent's business address.

20. The non-transitory, computer accessible, memory medium of claim 12, wherein the fourth user interface, as part of the buyer information on clients interested in purchasing properties, displays to the real estate agent multiple buying queries in the form of one or more cards, wherein each card in the one or more cards displays a prospect picture, one or more requirements, a price range, communication information, and a moving date.

21. The non-transitory, computer accessible, memory medium of claim 12, wherein the fourth user interface, as part of the buyer information on clients interested in purchasing properties, displays one or more input fields to receive a buying query for a given customer by the real estate agent, wherein the buying query indicates any of, or a combination of, the following: number of bedrooms, number of bathrooms, minimum price range, maximum price range, house type, move in date, information on whether the given customer is a first time home buyer, and information on whether the given customer is pre-approved for a loan.

22. The non-transitory, computer accessible, memory medium of claim 12, wherein the fourth user interface, as part of the buyer information on clients interested in purchasing properties, displays under contract information, any of, or combination of, the following: contract status, contract offered, contract countered, contact accepted, contract executed, contract declined, inspection information, appraisal information, final walk through information, settlement date, and one or fields to add comments.

* * * * *